April 25, 1961 T. N. BUSCH ET AL 2,981,301
METHOD AND APPARATUS FOR HARVESTING TREES
Filed Aug. 29, 1957 16 Sheets-Sheet 1
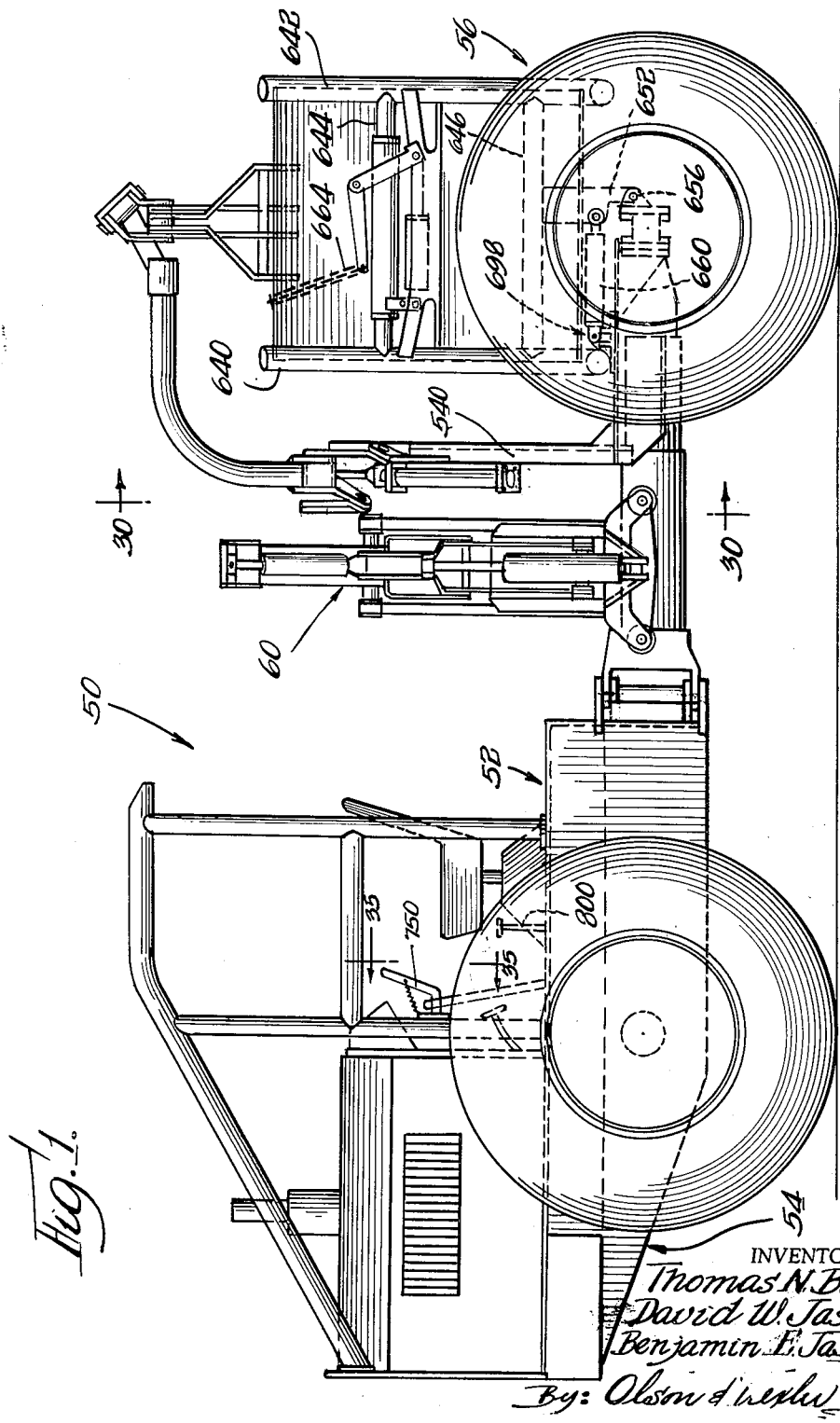
INVENTORS
Thomas N. Busch
David W. Jasper
Benjamin E. Jasper
By: Olson & Mecklew attys.

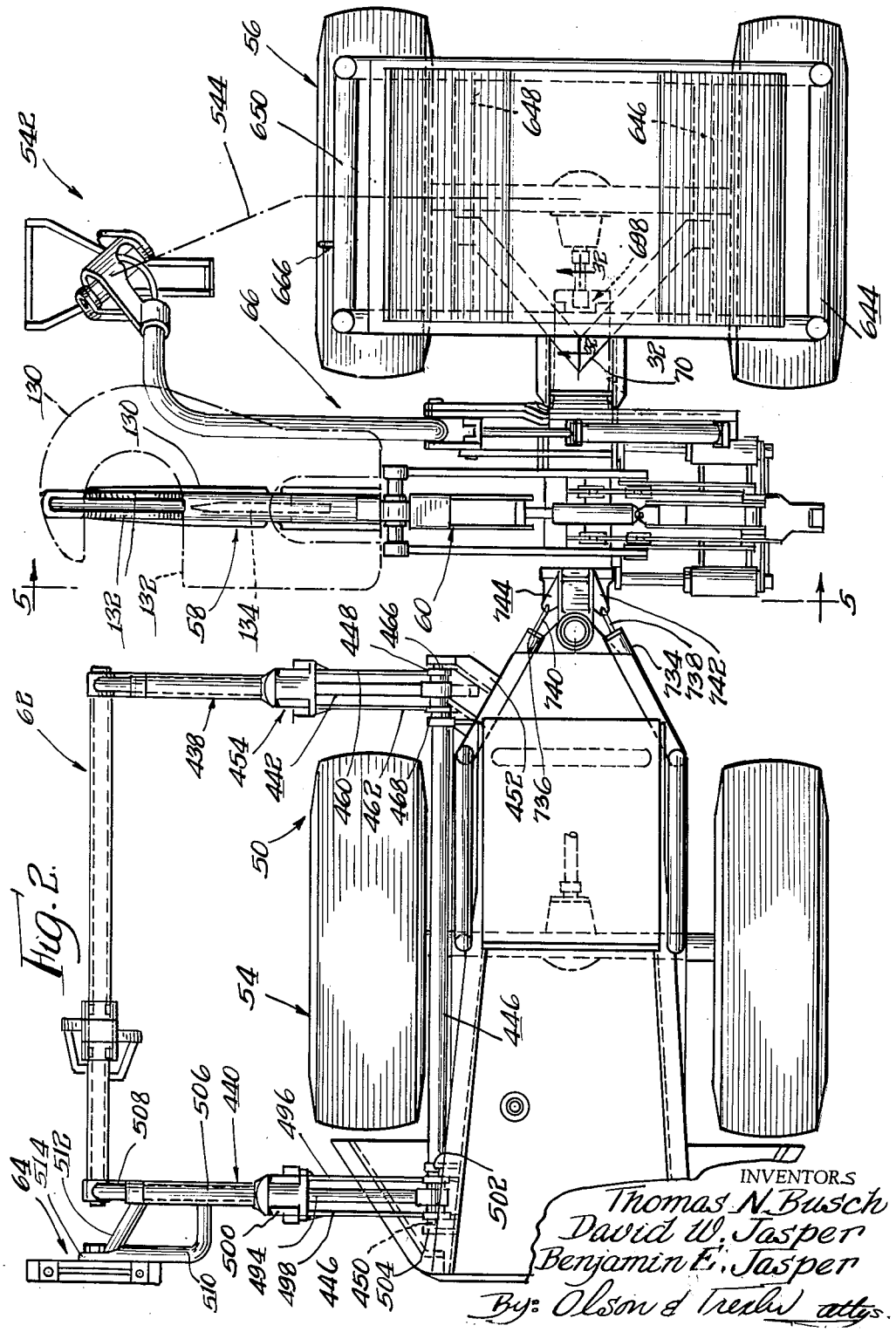

April 25, 1961  T. N. BUSCH ET AL  2,981,301
METHOD AND APPARATUS FOR HARVESTING TREES
Filed Aug. 29, 1957  16 Sheets-Sheet 3
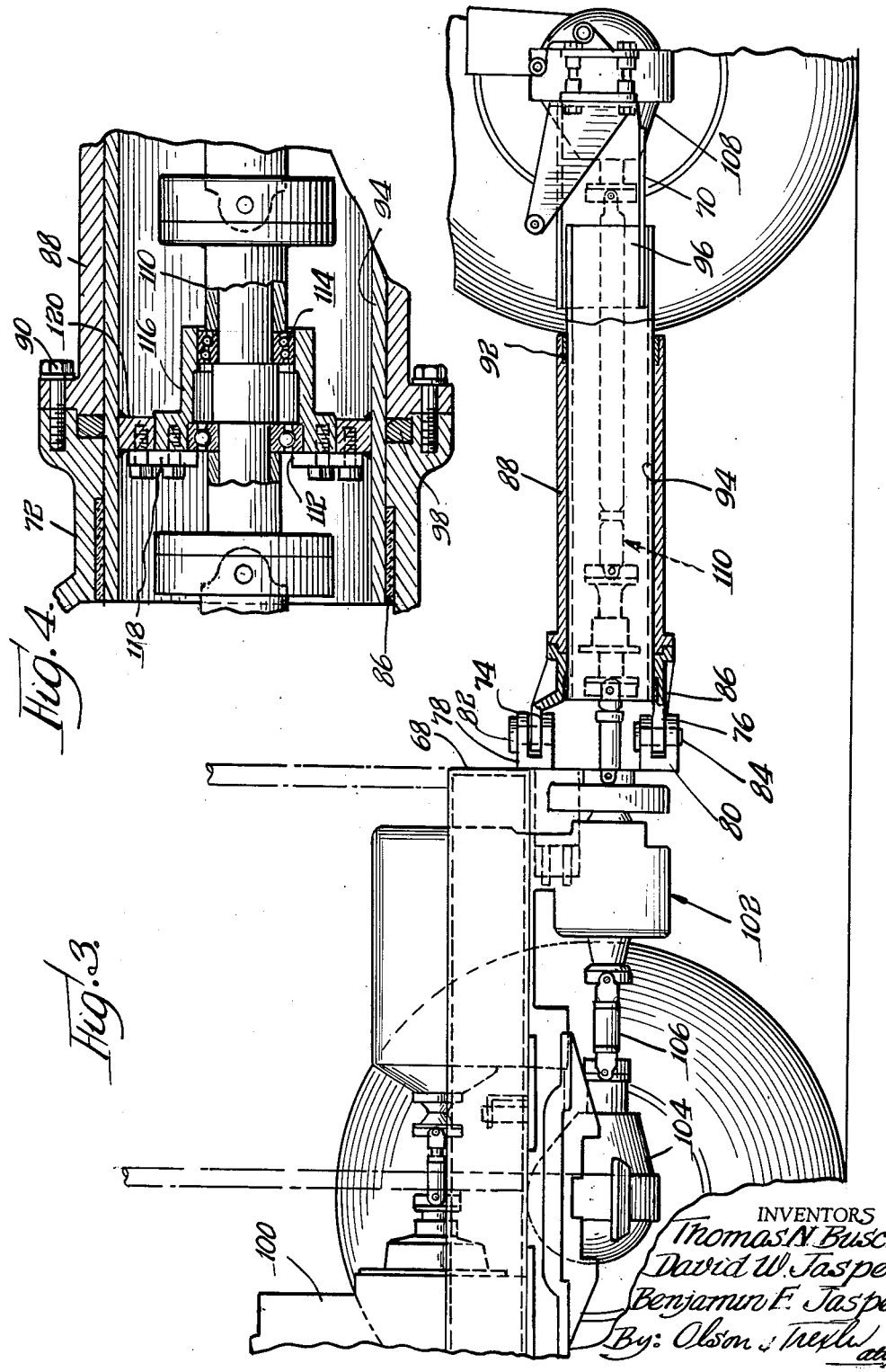

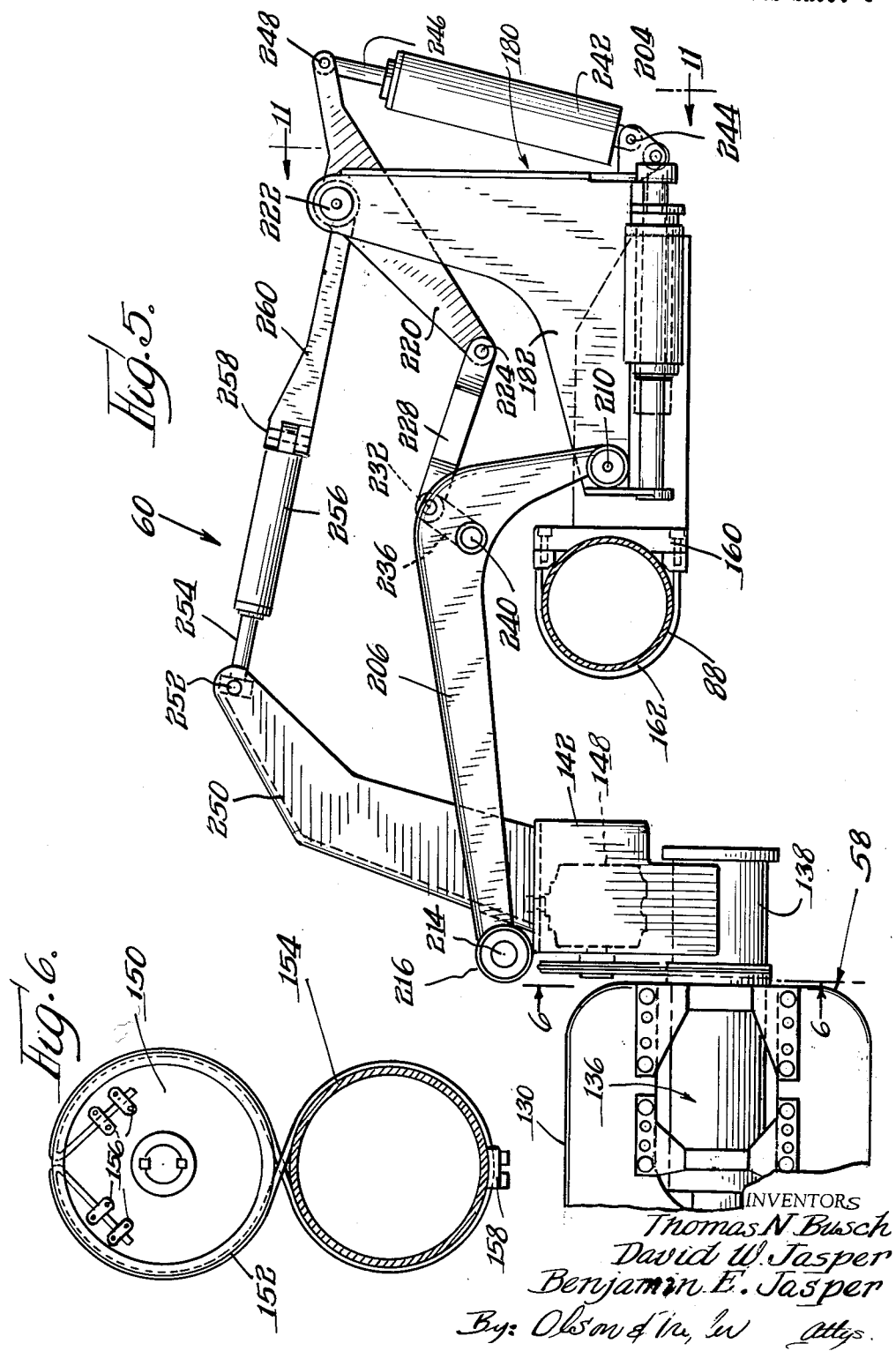

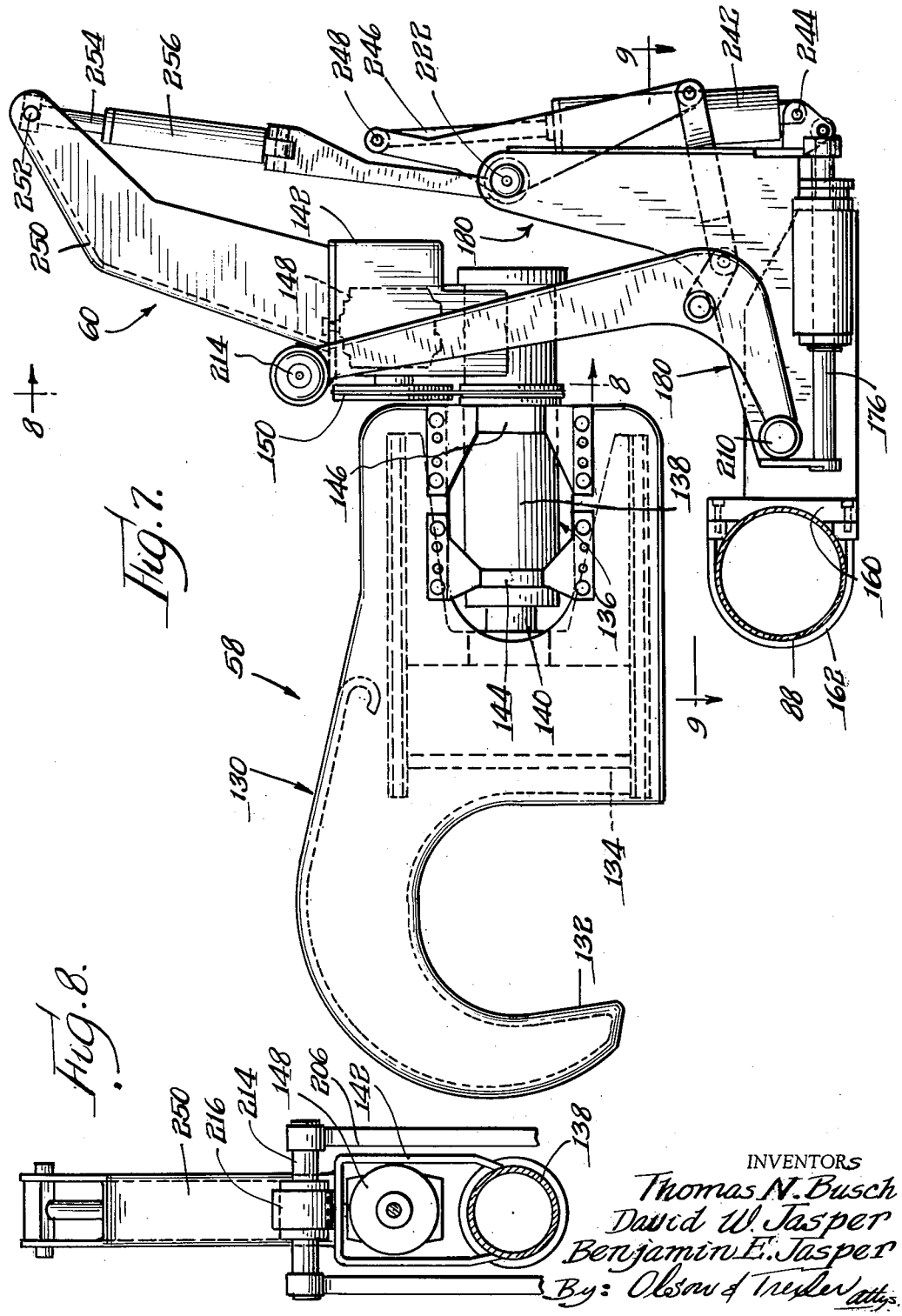

April 25, 1961 T. N. BUSCH ET AL 2,981,301
METHOD AND APPARATUS FOR HARVESTING TREES
Filed Aug. 29, 1957 16 Sheets-Sheet 6

INVENTORS.
Thomas N. Busch
David W. Jasper
Benjamin E. Jasper
By: Olson & Trexler Attys.

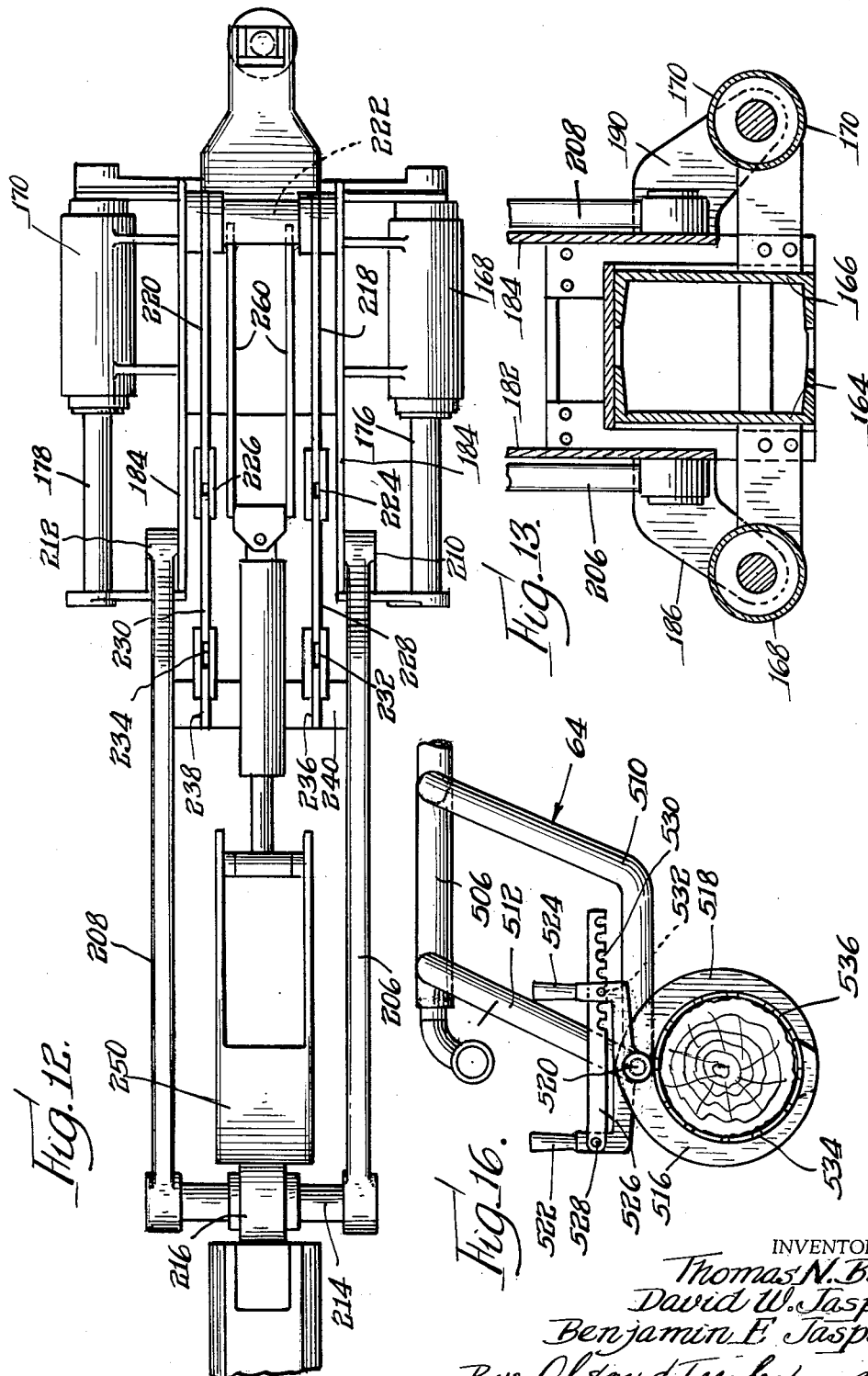

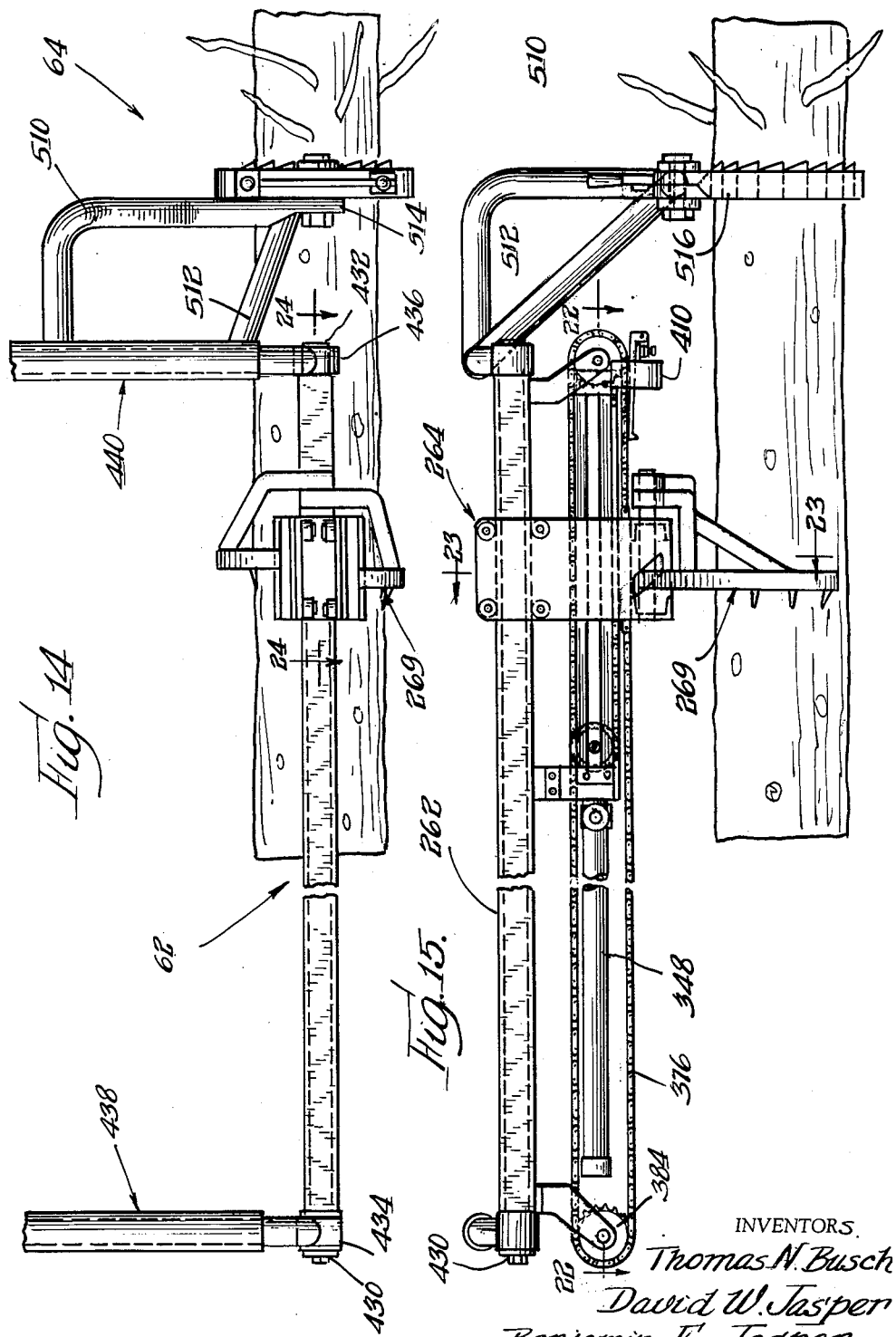

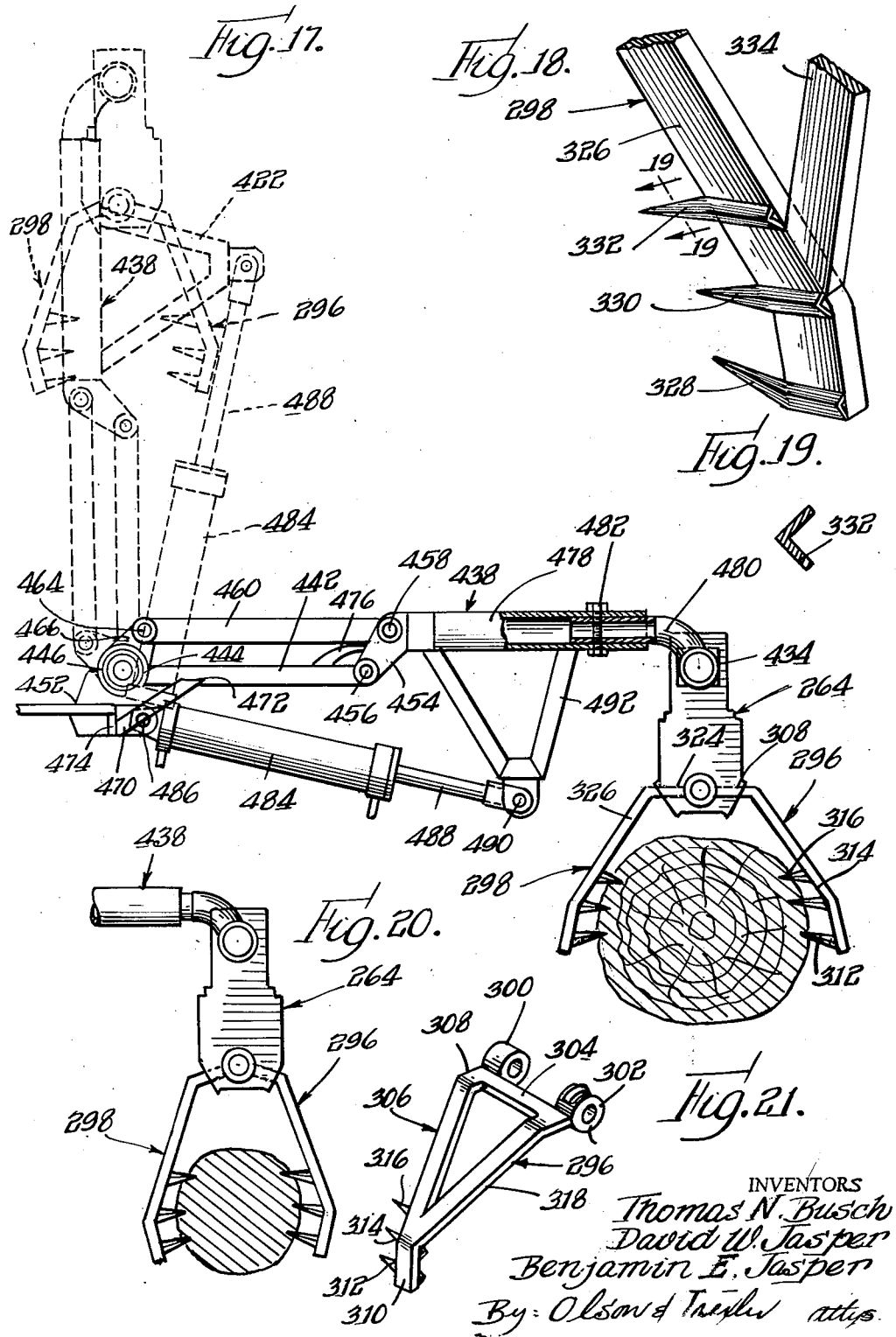

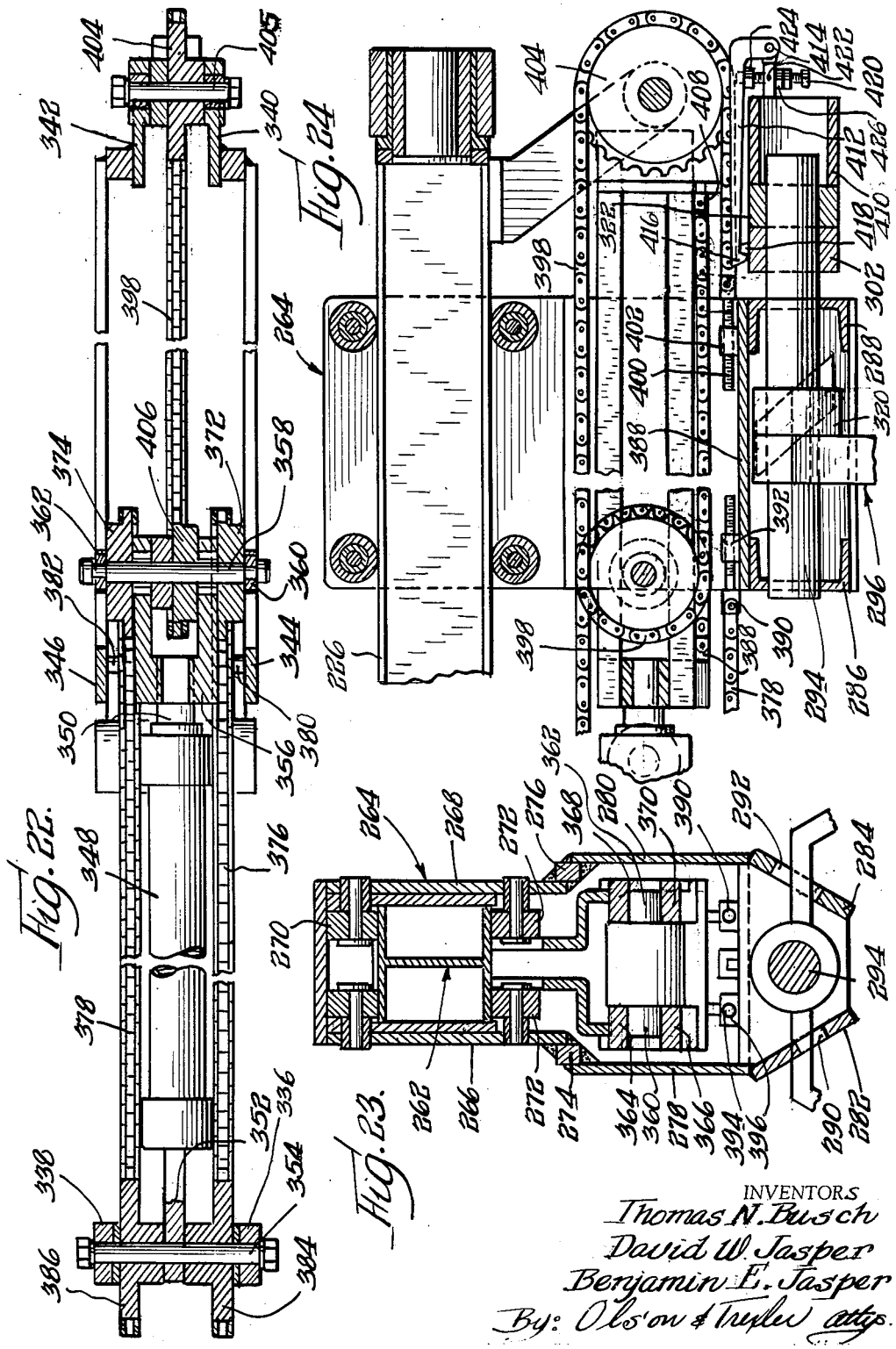

April 25, 1961  T. N. BUSCH ET AL  2,981,301
METHOD AND APPARATUS FOR HARVESTING TREES
Filed Aug. 29, 1957  16 Sheets-Sheet 11
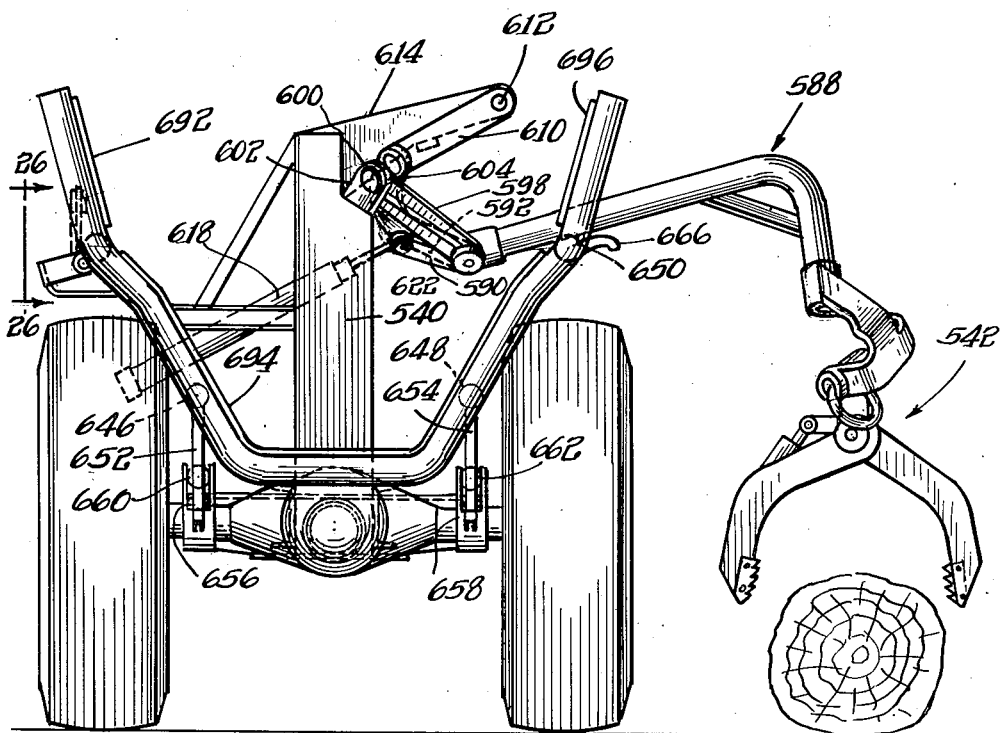
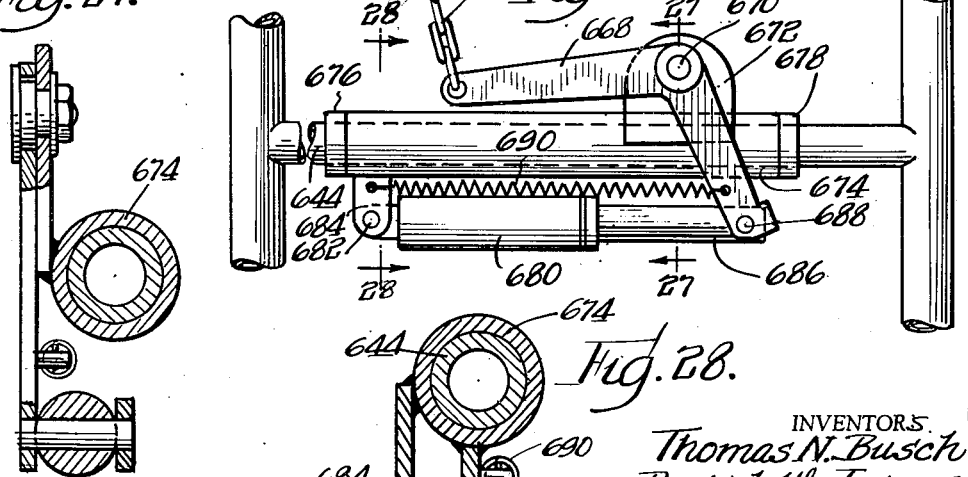
INVENTORS
Thomas N. Busch
David W. Jasper
Benjamin F. Jasper
By: Olson & ... attys.

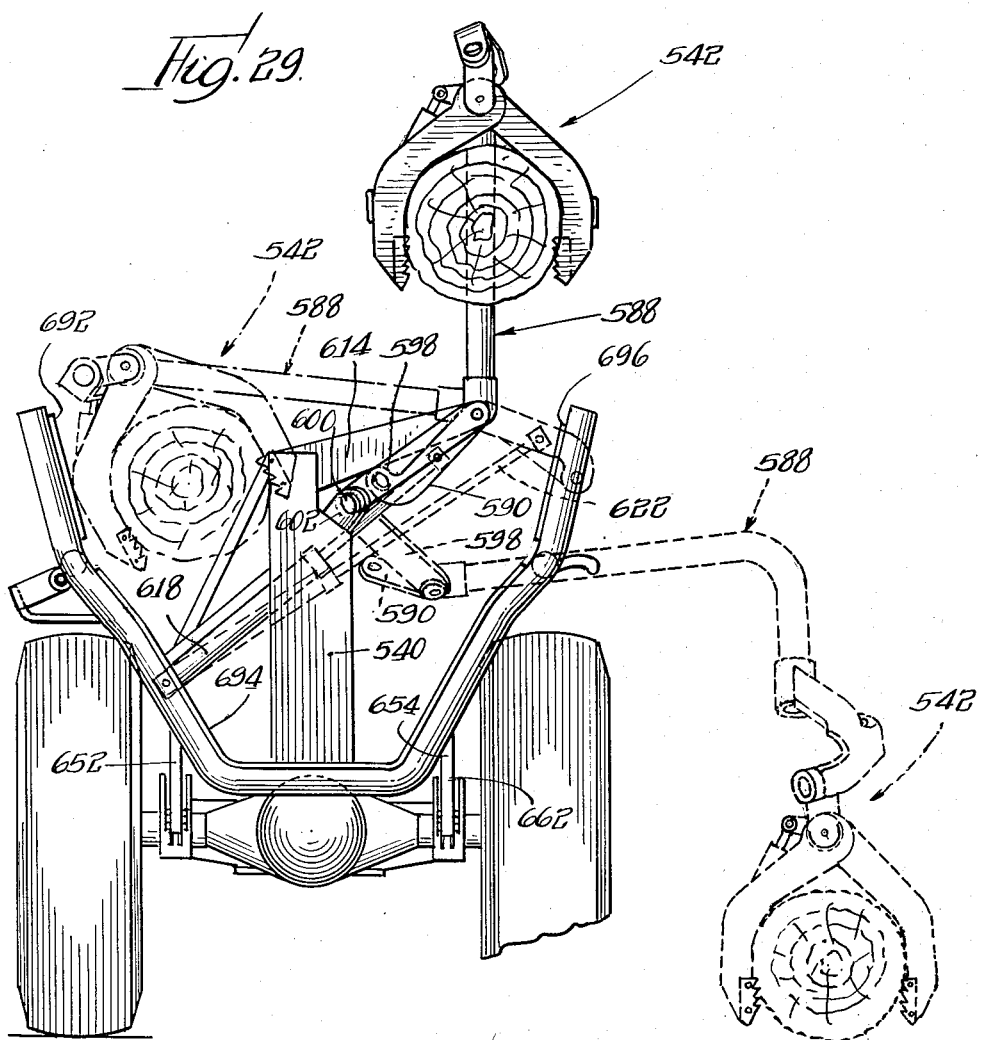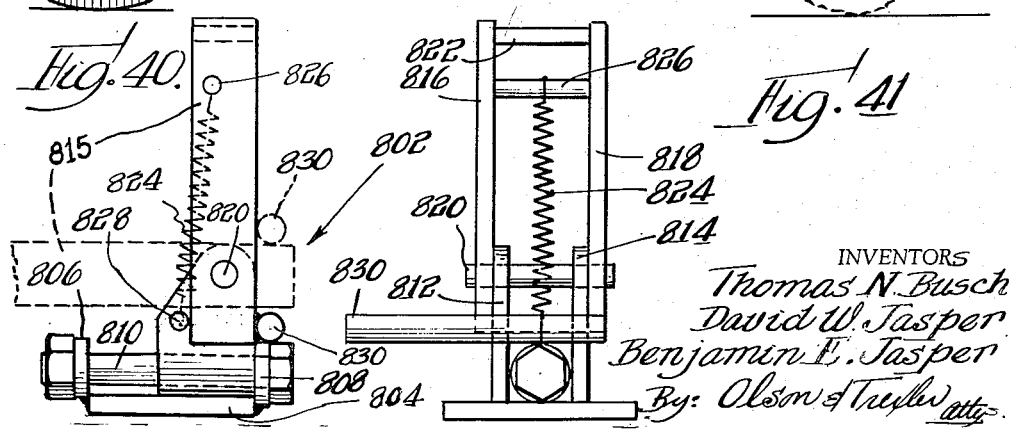

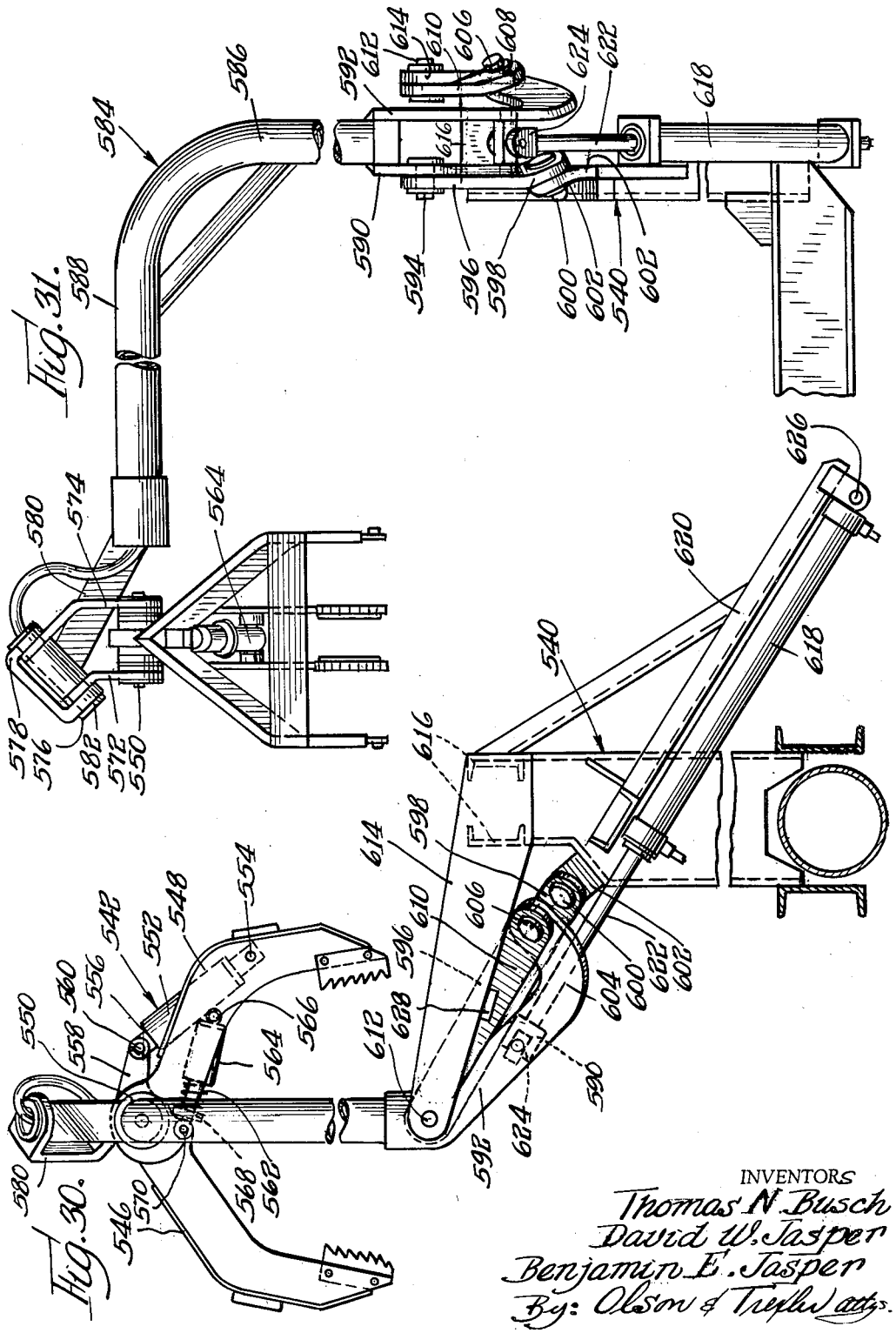

April 25, 1961 T. N. BUSCH ET AL 2,981,301
METHOD AND APPARATUS FOR HARVESTING TREES
Filed Aug. 29, 1957 16 Sheets-Sheet 14
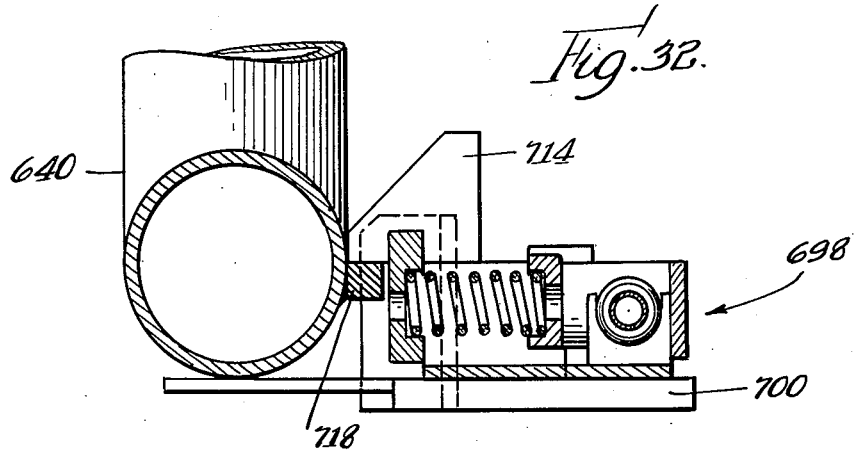
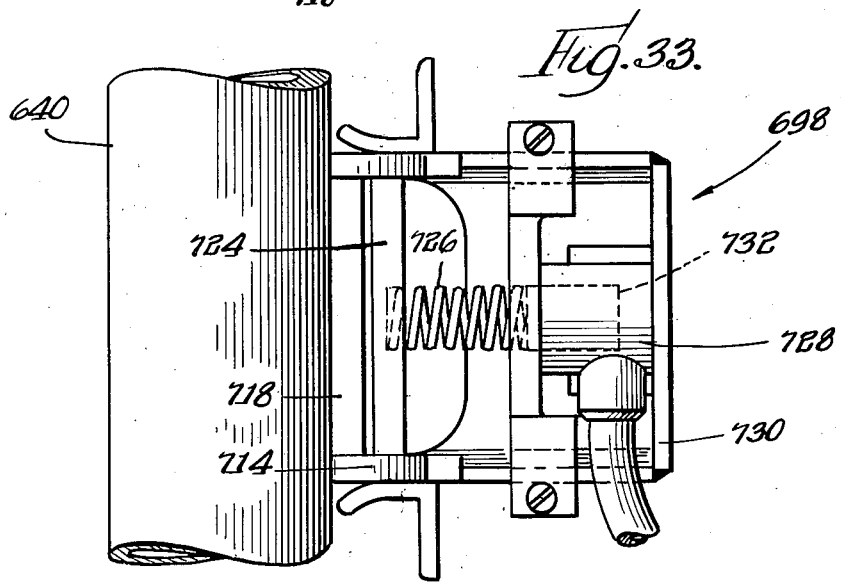
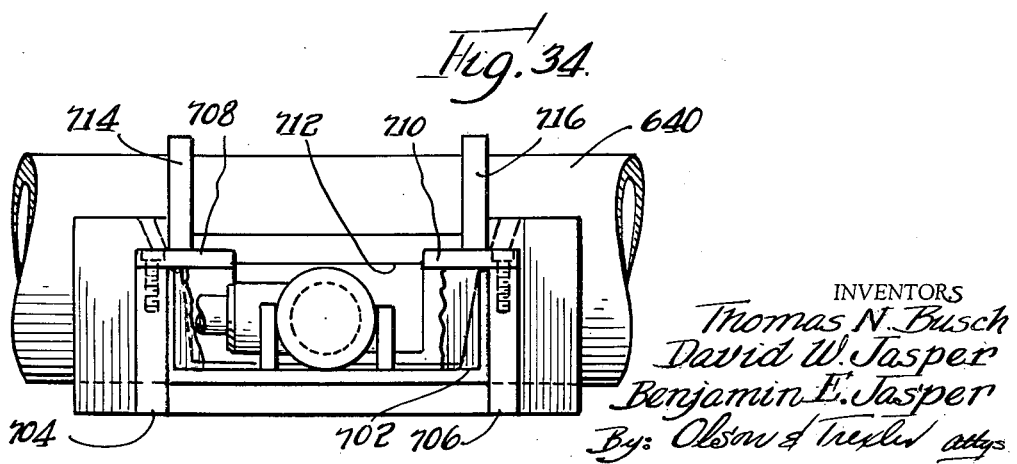
INVENTORS
Thomas N. Busch
David W. Jasper
Benjamin E. Jasper
By: Olson & Trexler attys

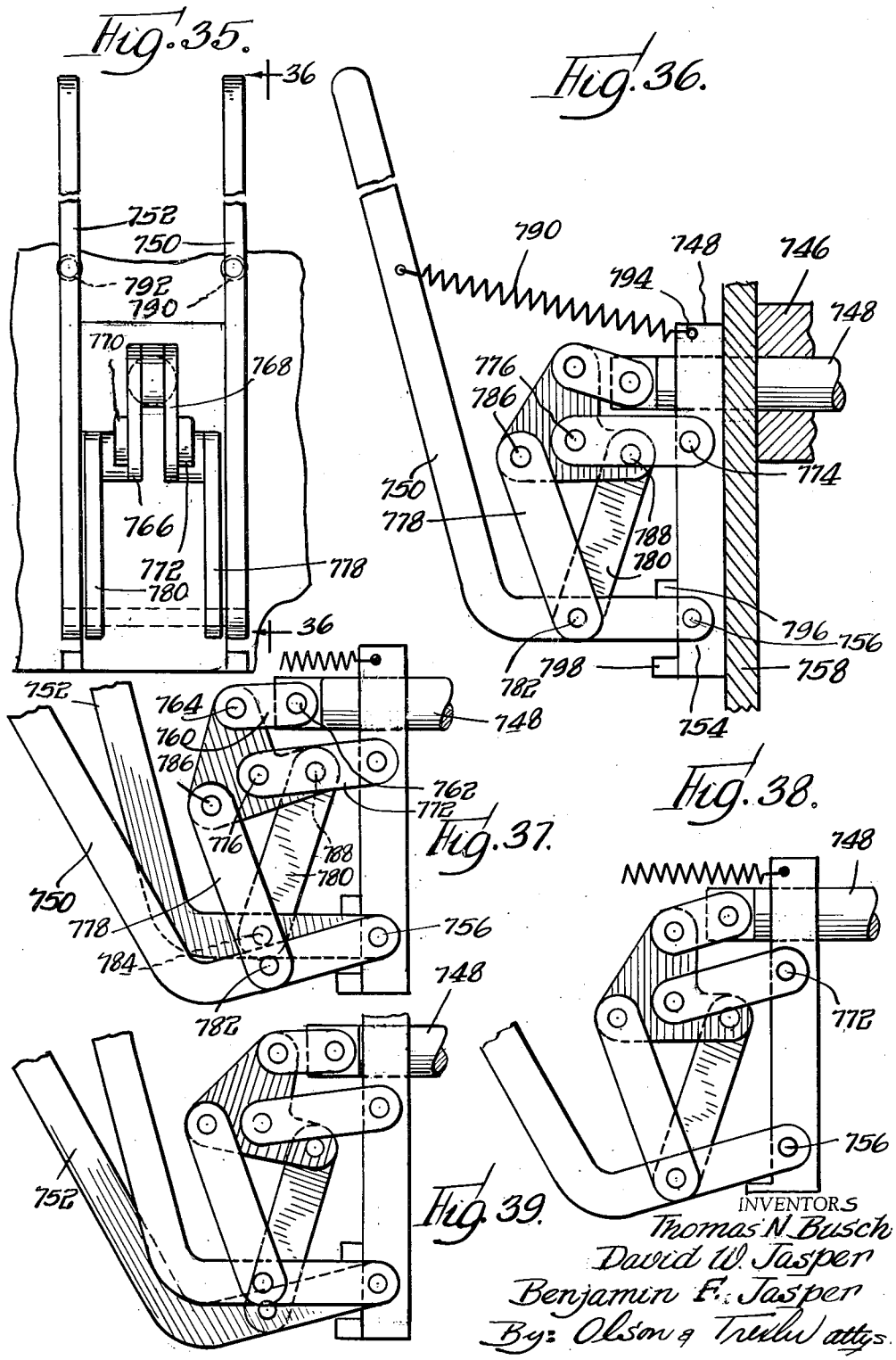

April 25, 1961     T. N. BUSCH ET AL     2,981,301
METHOD AND APPARATUS FOR HARVESTING TREES
Filed Aug. 29, 1957     16 Sheets-Sheet 16
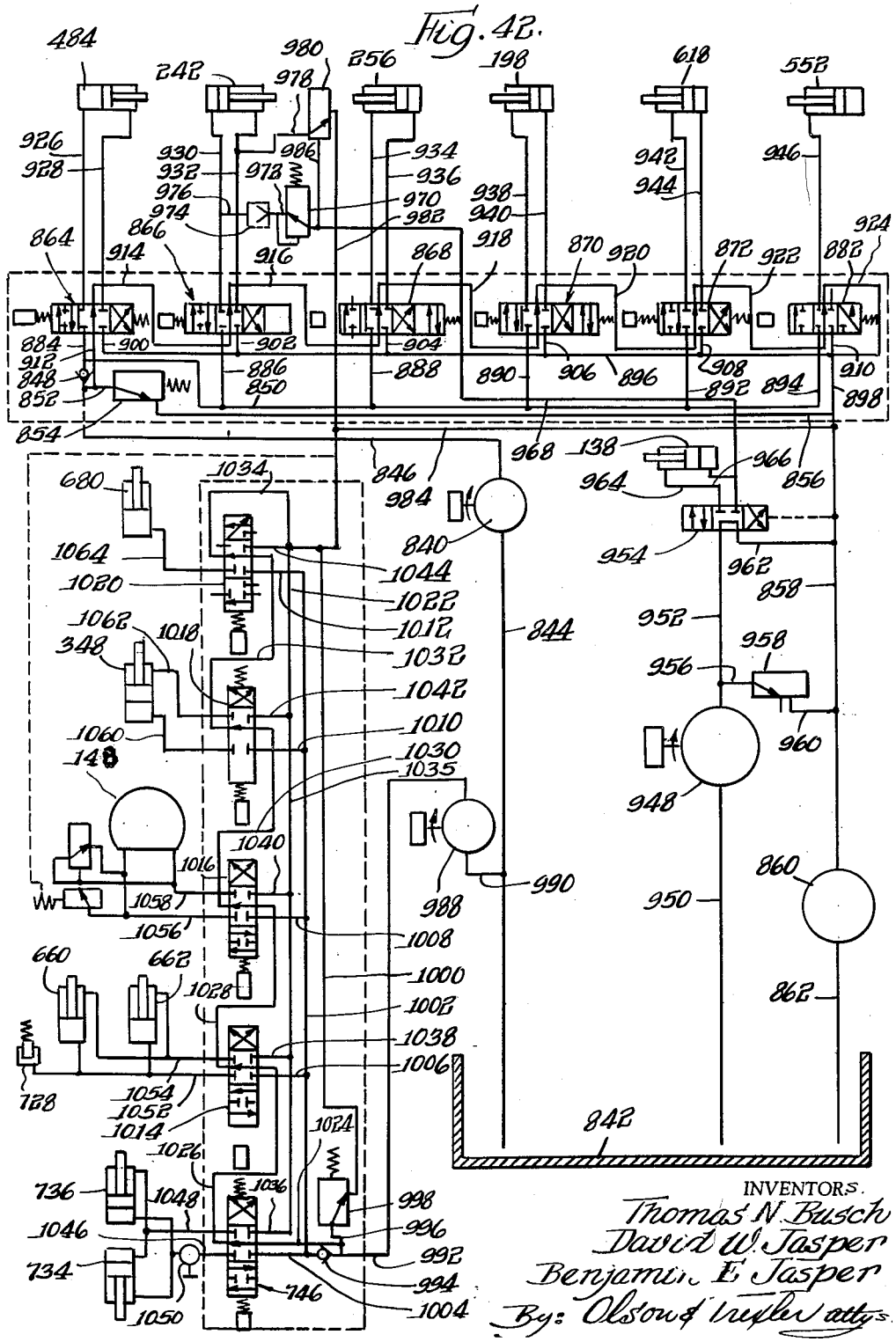
INVENTORS.
Thomas N. Busch
David W. Jasper
Benjamin E. Jasper
By: Olson & Trexler attys

United States Patent Office 2,981,301
Patented Apr. 25, 1961

2,981,301

METHOD AND APPARATUS FOR HARVESTING TREES

Thomas N. Busch, Daphne, Ala.; David W. Jasper, 247 E. Chestnut, Chicago, Ill.; and Benjamin E. Jasper, 9 Market Lane, Kankakee, Ill.

Filed Aug. 29, 1957, Ser. No. 681,044

36 Claims. (Cl. 144—3)

The present invention relates to a novel method and apparatus for harvesting trees. This application is a continuation-in-part of our co-pending application Serial No. 477,162, filed December 23, 1954, issued March 10, 1959 as Patent Number 2,876,816.

In our above mentioned co-pending application, there is disclosed an apparatus for harvesting trees which includes a vehicle having a tractor portion and a cart portion, a hydraulically actuated shearing head adjustably mounted on the vehicle so that it may be selectively positioned for felling and bucking or sectionalizing the trees, and additional means mounted on the vehicle for picking up sections severed from a tree and depositing them in the cart in a predetermined manner. The co-pending application further discloses the manner in which the apparatus is moved along a fallen tree during the sectionalizing and stacking operation and also the manner in which a stack of log sections on the cart is deposited in a bundle on the ground with the log sections standing on end to await further transportation. The present invention contemplates certain improvements in a method and apparatus for harvesting trees whereby a more efficient and effective apparatus is obtained and the trees may be more rapidly and economically harvested with reduced and simplified manipulations of the apparatus.

Another object of the present invention is to provide a novel apparatus for severing or felling a tree with shearing means, which apparatus is constructed so as to enable a shearing blade of said means to be forced through the tree in a manner which reduces power requirements, which reduces any possibility of injuring or bending the blade, and which maintains positive control of the tree throughout the severing operation in order properly to direct the fall of the tree.

A more specific object of the present invention is to provide a novel apparatus of the type described above which is constructed so as to enable the shearing blade to tilt automatically relative to the tree during a severing operation to various positions which minimize bending stresses on the blade and facilitate the severing and guiding of the tree.

A further object of the present invention is to provide a novel method and apparatus for harvesting trees whereby a fallen tree is sectionalized and stacked with the apparatus at a single location so as to minimize manipulation of the apparatus over the terrain and thereby promote more rapid and economical harvesting of the tree.

Still another object of the present invention is to provide a novel method and apparatus for felling a tree and then obtain positive control over the fallen tree and sectionalizing and stacking the tree while continuously maintaining positive control of both severed and unsevered portions of the tree so that once positive control of a fallen tree is obtained, the apparatus need not be traversed over the ground until the tree has been completely sectionalized and stacked.

A more specific object of the present invention is to provide a novel apparatus which is adapted to shear a standing tree with adjustable shearing means and then successively feed portions of the fallen tree to the shearing means for sectionalizing the tree, which shearing means is also adapted to be positioned for facilitating feeding of the tree and for maintaining control of the tree between feeding movements thereof.

Another specific object of the present invention is to provide a novel apparatus of the above described type with feeding means which is constructed so as positively to grip a fallen tree during a feeding movement and readily to release the tree during a return non-feeding movement without the aid of a special actuating device such as a hydraulic cylinder or the like.

Still another object of the present invention is to provide an apparatus of the above described type which is constructed so that a section of a tree which is being or is to be severed from the remainder of the tree may be gripped either during or after the severing operation and then lifted and transported rearwardly to a cart and finally deposited in the cart with the longitudinal axis of the tree sections substantially parallel to the longitudinal axis of the cart.

A further object of the present invention is to provide a novel apparatus of the type described above which is constructed so that the means for lifting a severed log section into the cart is actuated by a single fluid cylinder and cooperable piston rod arranged to shift the gripping and lifting means through an arc substantially in excess of 180 degrees and which is also constructed so that the piston rod will be under compression part of the time but also under tension when it is substantially extended so as to minimize any possibility of bending of the rod.

A still further object of the present invention is to provide a novel apparatus of the above described type which may be more easily driven through a forest and over rough terrain and which is also adaptable for being driven from place to place over public highways.

A more specific object of the present invention is to provide a novel apparatus of the above described type with novel hand operable control means which are constructed so as to facilitate steering of the apparatus.

Still another object of the present invention is to provide a novel method and apparatus of the above described type whereby branches of a fallen tree are automatically removed from the tree as successive portions of the tree are fed to the shearing means during the sectionalizing operation.

Other objects and advantages of the present invention will become apparent from the following description and the accompanying drawings wherein:

Fig. 1 is a side elevational view showing an apparatus incorporating features of the present invention;

Fig. 2 is a plan view of the novel apparatus of this invention;

Fig. 3 is an enlarged fragmentary view partially broken away showing a portion of the vehicle in greater detail;

Fig. 4 is a further enlarged partial sectional view of the portion of the apparatus included in the mid-portion of Fig. 3;

Fig. 5 is an enlarged fragmentary cross sectional view taken along line 5—5 in Fig. 2 and showing the shearing means in an extended position;

Fig. 6 is a further enlarged sectional view taken along line 6—6 in Fig. 5;

Fig. 7 is a view similar to Fig. 5 but shows the shearing means in a retracted position;

Fig. 8 is a fragmentary sectional view taken along line 8—8 in Fig. 7;

Fig. 12 is an enlarged plan view of a portion of the apparatus shown in Fig. 5;

Fig. 13 is a fragmentary sectional view taken along line 13—13 in Fig. 9;

Fig. 14 is a plan view showing a portion of the apparatus utilized to feed a fallen tree to the shearing means;

Fig. 15 is a side elevational view of the portion of the apparatus shown in Fig. 14;

Fig. 16 (sheet 7) is a righthand end view of the portion of the apparatus shown in Fig. 14;

Fig. 17 (sheet 9) is a lefthand end view of the portion of the apparatus shown in Fig. 15 and further shows, in broken lines, the manner in which this portion of the apparatus may be retracted during transportation of the apparatus from one location to another;

Fig. 18 is an enlarged fragmentary perspective view showing a jaw portion of the feeding apparatus adapted to engage the tree;

Fig. 19 is a cross sectional view taken along line 19—19 in Fig. 18;

Fig. 20 is a fragmentary end view similar to Fig. 17 but shows the gripping head of the feeding mechanism applied to a log of smaller diameter;

Fig. 21 is a perspective view showing one of the elements of the feeding means gripping head;

Fig. 22 is an enlarged fragmentary cross sectional view taken along line 22—22 in Fig. 15;

Fig. 23 is an enlarged fragmentary cross sectional view taken along line 23—23 in Fig. 15;

Fig. 24 is an enlarged fragmentary sectional view taken generally along line 24—24 in Fig. 14;

Fig. 25 is an end view of the cart and log loading portion of the apparatus of this invention and shows the log lifting and loading means in a somewhat lowered position just prior to application to a log;

Fig. 26 is a fragmentary elevational view of a portion of the apparatus as seen from line 26—26 in Fig. 25;

Fig. 27 is an enlarged sectional view taken along line 27—27 in Fig. 26;

Fig. 28 is an enlarged cross sectional view taken along line 28—28 in Fig. 26;

Fig. 29 is a view somewhat similar to Fig. 25 but shows the lifting mechanism in solid lines at an elevated position and further shows the lifting mechanism in broken lines at extreme extended and retracted positions;

Fig. 30 is an enlarged fragmentary sectional view, partially broken away, taken generally along line 30—30 in Fig. 1;

Fig. 31 is a side elevational view of the portion of the apparatus shown in Fig. 30 as viewed from the left side of Fig. 30;

Fig. 32 is an enlarged fragmentary sectional view taken generally along line 32—32 in Fig. 2 and shows latch means for restraining the cart against tilting;

Fig. 33 is a fragmentary plan view showing the latch means of Fig. 32;

Fig. 34 is a fragmentary elevational view showing the latch means from the righthand end of Fig. 33;

Fig. 35 is a fragmentary elevational view showing a portion of novel mechanism utilized for steering the apparatus as it is seen from the line 35—35 in Fig. 1;

Fig. 36 is a fragmentary sectional view taken generally along line 36—36 in Fig. 35;

Figs. 37, 38 and 39 are similar to Fig. 36 but show various positions to which the mechanism may be manipulated for steering the apparatus;

Fig. 40 (sheet 12) is a view showing a gear shift lever stop mechanism incorporated in the apparatus of the present invention;

Fig. 41 is a view of the mechanism shown in Fig. 40 as viewed from the right side of Fig. 40; and Fig. 42 (sheet 16) is a diagrammatic view showing a hydraulic circuit for the apparatus of the present invention.

Figure 9:
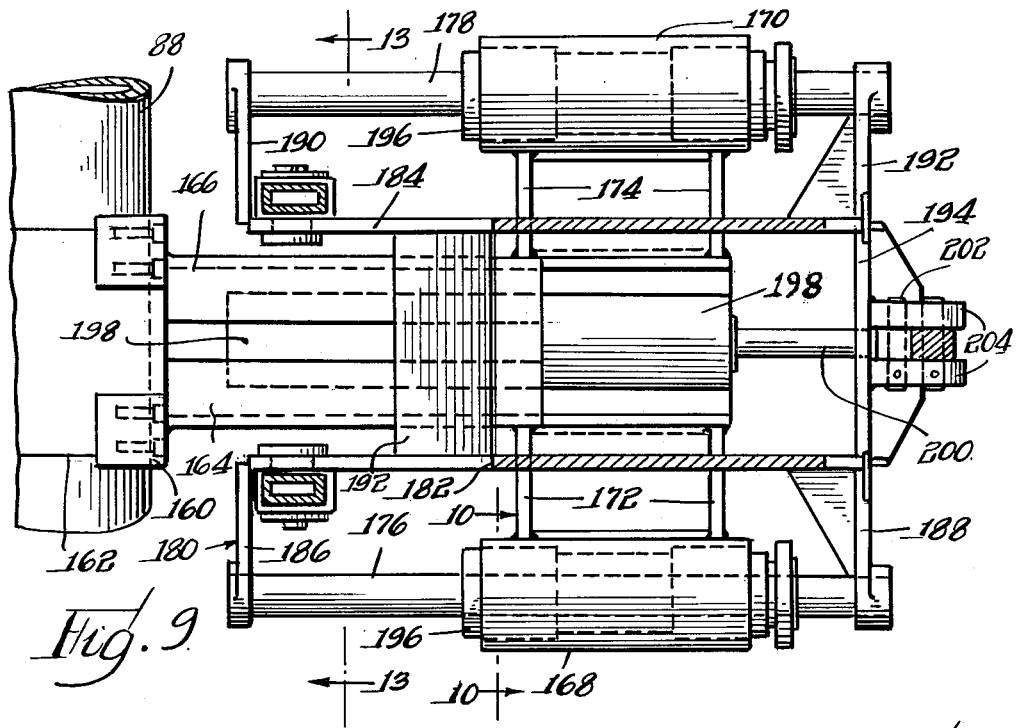
Fig. 9 is a fragmentary sectional view taken along line 9—9 in Fig. 7.

Referring now more specifically to the drawings wherein like parts are designated by the same numerals throughout the various figures, an apparatus 50 incorporating features of the present invention is shown generally in Figs. 1 and 2. This apparatus comprises a vehicle generally designated by the numeral 52 having a forward tractor portion 54 and a trailing cart portion 56. However, as described more fully hereinbelow, the vehicle is provided with four wheel drive means so that it is well adapted for travel over various types of terrain. A shearing head 58 is mounted on the vehicle by means of adjustable mechanism generally designated by the numeral 60 which shearing head is adapted to be extended or retracted and to fell a tree and then sectionalize or buck a fallen tree. In accordance with a feature of the present invention means generally designated by the numeral 62 is mounted on the vehicle for feeding a fallen tree to the shearing means during a bucking operation, which feeding means also carries means 64 for severing or skinning branches from a tree during the feeding operation. A log loading mechanism generally designated by the numeral 66 is also mounted on the vehicle for lifting sections of the tree into the cart portion of the apparatus.

As shown in Figs. 1–4, main frames 68 and 70 of the tractor and cart portions of the vehicle are joined by means which enables the cart to turn about both vertical and longitudinally extending axes with respect to the tractor portion so that the vehicle is especially adapted for travel over rough or uneven terrain. This means includes a tubular socket portion 72 having legs 74 and 76 connected to brackets 78 and 80 secured to the tractor frame. This connection is obtained by pins 82 and 84 so that the socket portion is adapted to pivot about a vertical axis with respect to the tractor. A bearing 86 is mounted within the socket portion, and an elongated rigid sleeve 88 has one end secured to the socket portion 72 by a plurality of bolts 90 and has another annular bearing 92 mounted within an opposite end portion thereof. A tube 94 has one end welded or otherwise secured to members 96 of the cart frame and extends within the socket portion 72 and sleeve 88 and is supported rotatably by the bearings 86 and 92. A thrust bearing ring 98 is welded to the tube 94 and is disposed between ends of the socket portion 72 and the sleeve 88 as shown best in Fig. 4 for retaining the tube against axial displacement relative to the sleeve.

The tractor is provided with a conventional internal combustion engine 100 suitably connected with a transmission 102 which, in turn, is connected with front wheel drive means 104 by suitable drive shaft means 106. A rearwardly extending power take-off of the transmission is connected with rear wheel drive means 108 by drive shaft means generally designated by the numeral 110 extending through the tube 94. This drive shaft means includes, of course, suitable universal joint devices. As shown best in Fig. 4, a portion of the drive shaft means 110 is rotatably supported within the tube 94 by bearing assemblies 112 and 114. These bearing assemblies are mounted within opposite ends of a tubular support member 116 which is bolted or otherwise secured to an annular plate 118. This plate is, in turn, bolted or otherwise secured to a ring 120 that is welded to the tube 94.

The shearing head 58 which is shown in Figs. 2, 5 and 7 includes claw-like body means 130 having a lateral opening 132 in one side thereof for receiving a tree to be severed and slidably supporting a reciprocable shearing blade 134 which is adapted to traverse the opening to sever a tree. A reciprocable type fluid motor generally designated by the numeral 136 is provided for actuating the shearing blade, which fluid motor comprises a hydraulic cylinder 138 and a piston 140 extending from the cylinder and suitably connected with the shearing blade. The cylinder 138 is welded or otherwise fixed to side walls of a housing structure 142 which, in turn, is supported in the manner described below, and the body means of the shearing head is provided with bearings 144 and 146 for rotatably mounting the body means on the cylinder 138.

It is to be noted that the rotatably supported shearing head may be turned to various positions so that, for example, the lateral opening 32 faces upwardly as shown in solid lines in Fig. 2 or sideways as shown in broken lines in Fig. 2 or downwardly as shown in Fig. 7. Such rotation of the shearing head through more than 270 degrees is accomplished by means of a rotary hydraulic motor 148 mounted within the housing structure 142. A pulley 150 is secured to the output shaft of the rotary hydraulic motor, and a flexible element or cable 152 which is wound in the form of a figure 8 (Fig. 6) extends around the pulley 150 and a circular member 154 which is fixed to the body means 130 of the shearing head and which encircles the non-rotatable hydraulic cylinder 138. Opposite ends of the cable are fixed to the pulley by suitable clamps 156, and an intermediate portion of the cable is secured to the member 154 by a clamp 158. It will be appreciated that this means for rotating the shearing head is of simple and rugged construction and may be easily maintained sufficiently clean so that its operation will not be mpaired.

Figures 10, 11:
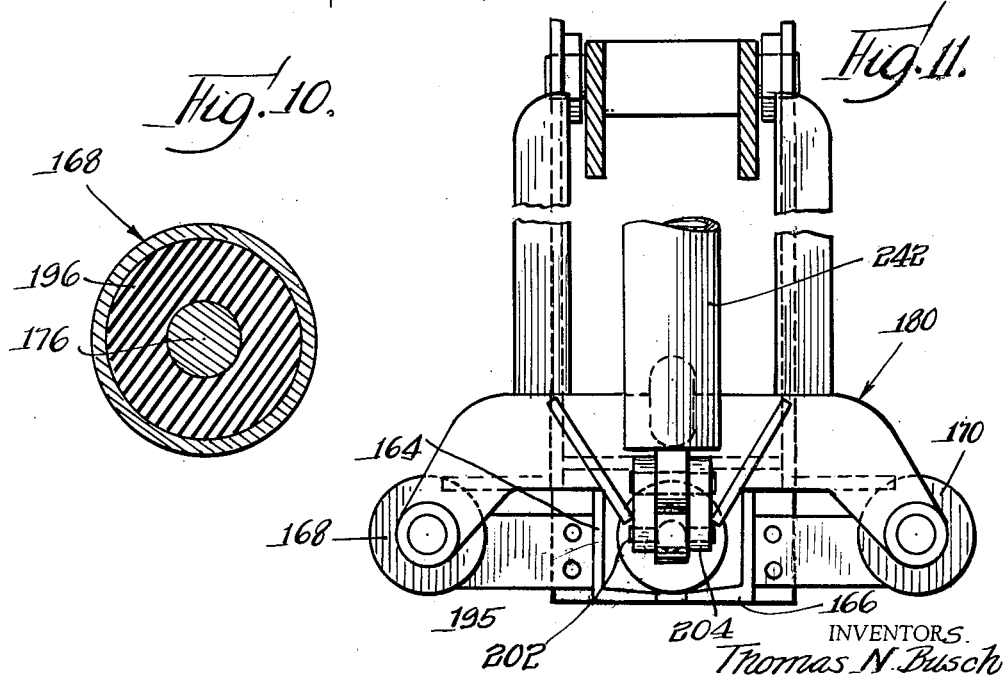
Fig. 10 is an enlarged fragmentary sectional view taken along line 10—10 in Fig. 9.
Fig. 11 is an enlarged fragmentary sectional view taken generally along line 11—11 in Fig. 5.

The mechanism 60 for mounting the shearing head on the vehicle is shown in Figs. 1, 2 and 5-13. This mechanism is provided with a base member 160 which is detachably secured against the side of the sleeve 88 by means including a strap 162 which encircles the sleeve, see particularly Figs. 5, 7 and 9. A pair of oppositely disposed channels 164 and 166 extends laterally from the member 160, which channel members are welded to the member 160. Bearing assemblies 168 and 170 are respectively disposed at opposite sides of the channel members. Support members 172 are welded to the side of the channel member 164 and also to the shell of the bearing assembly 168, and similar support members 174 extend between and are welded to the channel member 166 and the shell of the bearing assembly 170. Rods 176 and 178 respectively extend through and are axially slidable within the bearing devices 168 and 170, which rods form a part of a carriage structure generally designated by the numeral 180, which carriage structure is shiftable to accomplish adjustment of the shearing head transversely of the longitudinal axis of the apparatus in the manner and for the purposes described below. This carriage also includes upstanding side plates 182 and 184 (Fig. 9) from which pairs of arms 186—188 and 190—192 extend respectively for connection with ends of the rods 176 and 178. Transverse members 192 and 194 extend between and are welded to the opposite side plates of the carriage. For a purpose more fully described below, the carriage is adapted to tilt yieldably relative to the axes of the bearing devices and this is accomplished by providing the bearing devices with resilient or rubber bushings 196 as indicated best in Figs. 9 and 10. As indicated best in Figs. 9 and 11, a fluid motor is provided for adjustably shifting the carriage, which motor includes a hydraulic cylinder 198 secured to the channel members, and a ram 200 pivotally connected as at 202 to lugs 204 welded to the transverse member 194.

The shearing head supporting mechanism 60 has a linkage system between the shearing head and the carriage structure 180 selectively for moving the shearing head to and from a retracted position shown in Fig. 7 and various extended positions such as that shown in Fig. 5. This linkage system comprises generally L-shaped members 206 and 208 respectively (Fig. 12) having ends pivotally connected to the side plates 182 and 184 by bearing means 210 and 212. Opposite or outer ends of the arms 206 and 208 are pivotally connected to a transverse shaft 214 which is interconnected with the housing structure 142 by bracket means 216. Bell cranks 218 and 220 are pivotally mounted intermediate their ends on a shaft 222 which extends between upper ends of the carriage side plate members 182 and 184. Ends of these bell crank members are respectively pivotally connected by pins 224 and 226 to links 228 and 230. Opposite ends of these links are respectively pivotally connected by pins 232 and 234 to short arms 236 and 238 which are secured to a shaft 240 extending between the L-shaped arms 206 and 208. In order to extend and retract the shearing head, a hydraulic motor is provided, which motor has a cylinder 242 pivotally connected by a pin 244 to the lugs 204 and a ram 246 which is pivotally connected to ends of the bell crank members 218 and 220 by a pin 248. It will be noted that when the double-acting cylinder is operated to retract the ram as shown in Fig. 5, the bell crank members 218 and 220 will be pivoted in a clockwise direction as viewed in Fig. 5 and the generally L-shaped arms 206 and 208 will be pivoted in a counter-clockwise direction so as to shift the shearing head toward an extended position. Alternatively, when the ram 246 is shifted toward the extended position shown in Fig. 7, the bell crank members are pivoted in a counterclockwise direction and the generally L-shaped arms are pivoted in a clockwise direction so as to raise the shearing head and shift it to a position over the central sleeve 88. In this retracted position, the shearing head is located within the outermost boundaries of the vehicle so that the vehicle may be transported from place to place without danger of the shearing head engaging any obstacle.

It will be appreciated that with the apparatus thus far described, the shearing head is adapted to pivot about the axis of the shaft 214 relative to the generally L-shaped arms 206 and 208. The mechanism 60 is provided with additional means which is adapted to maintain the shearing head so that its longitudinal axis is, for example, substantially horizontal in substantially all of the retracted and extended positions of the head, which means is also adapted to pivot the shearing head about the axis of the shaft 214, or to permit the shearing head to so pivot in order to locate the longitudinal axis of the shearing head at various angles inclined to the horizontal. This means comprises an arm 250 rigidly welded or otherwise secured to and extending upwardly from the housing structure 142. An upper end of the arm 250 is pivotally connected by pin means 252 to a ram 254 operating within a hydraulic cylinder 256. The cylinder, is, in turn, pivotally connected by a pin 258 disposed at right angles to the pin 252 to a link 260. The link 260 extends between the bell crank members 218 and 220 and is also pivotally connected to the shaft 222. It is to be noted that the axes of the shafts or pins 210, 214, 222 and 252 are substantially located at corners of a parallelogram in all positions of the linkage system, which linkage system is constructed so that with the ram 254 in the partially extended positions shown in Figs. 5 and 7, the longitudinal axis of the shearing head will be substantially maintained in a horizontal position in all retracted and extended conditions of the linkage system. However, as mentioned above, the shearing head may be tilted about the shaft 214 in either direction by extending or retracting the ram 254.

Referring now particularly to Figs. 2, 14-15 and 17-24, the means 62 for feeding successive sections of a fallen tree to the shearing head will be described. This means includes an elongated I-beam or track member 262 which is adjustably supported at the side of the vehicle in the manner described below. A carriage 264 is mounted on the track member for reciprocating movement, which carriage has opposite side members 266 and 268 (Fig. 23) extending along opposite sides of the track member 262 and carrying upper and lower sets of rollers 270 and 272 engageable with the upwardly and downwardly facing surfaces of the track member.

Spacer blocks 274 and 276 are respectively welded to lower marginal portions of the side members 266 and 268, and additional depending side members 278 and 280 are welded to and depend from the spacer blocks 274 and 276. Inwardly inclined or converging cam plates 282 and 284 are respectively welded to lower margins of the side members 278 and 280, and transverse channel members 286 and 288 extend between and are welded to opposite end portions of the cam plates 282 and 284. Similar but offset inclined cam slots 290 and 292 are respectively provided in the cam plates 282 and 284 for the purpose described below.

A rod 294 extends between and is secured to the transverse channel members 286 and 288 (Fig. 24) and also has a substantial portion extending outwardly of the member 288. Three engaging and feeding jaw structures 296 and 298 are pivotally and axially slidably mounted on the rod 294. As shown best in Figs. 15, 17, 21 and 24, the jaw structure 296 has a pair of axially spaced bearing portions 300 and 302 joined by a member 304 welded thereto and another laterally extending member 306 having a first portion 308 welded to the member 304 and projecting outwardly therefrom through the cam slot 290. The member 306 then extends outwardly and downwardly and has a lower end portion 310 which extends relatively sharply downwardly. A plurality of tooth elements 312, 314 and 316 is welded to the lower portions of the member 306, which tooth elements project inwardly from the member for biting into a tree. The lowermost element 312 is inclined upwardly as well as inwardly to facilitate lifting of the tree in the manner described below. A brace member 318 extends between and is welded or otherwise secured to the member 304 adjacent the bearing 302 and the lower and outer end portion of the member 306.

The jaw structure 298 is similar to the jaw structure 296 described above and need be only briefly described. Thus, the jaw structure 298 has bearing portions 320 and 322 (Fig. 24) slidably disposed on the rod 294 behind the bearing portions 300 and 302 respectively when considered with respect to the direction of movement of the jaw structures during feeding of the log. An axially extending member 324 (Fig. 17) similar to the member 304 extends between and is welded to the bearing portions 320 and 322, and a laterally extending member 326 (Fig. 17) which corresponds to the above described member 306 has a portion welded to the member 324 and extending outwardly through the cam slot 292 and additional downwardly and outwardly extending portions to which tooth elements 328, 330 and 332 (Figs. 18 and 19) are welded. This jaw structure is also provided with a brace member 334 which corresponds to the above described member 318. As shown best in Fig. 19, the tooth element 332 has a substantially V-shaped cross section which faces outwardly away from a tree to be engaged. The remaining tooth elements have similar transverse cross sections, and all of the tooth elements are provided with sharpened points. Considerable difficulty has been encountered in obtaining tooth elements which will bite into a tree with sufficient aggressiveness to prevent the jaw structures from slipping along the tree during a feeding operation. It has been found that these difficulties are substantially overcome by the tooth elements which are shown and described herein. It will be further appreciated that the generally V-shaped cross section of the tooth elements makes the tooth elements relatively rugged and resistant to bending.

Pairs of bracket arms 336—338, 340—342 and 344—346 (Fig. 22) are welded or otherwise secured to and depend from opposite ends and an intermediate portion, respectively, of the I-beam or track member 262. These bracket arms serve to support means which is adapted to traverse or actuate the feeding jaw carriage 264. This means comprises a hydraulic motor having a cylinder 348 and a ram 350 operable therein, which cylinder and ram have a length similar to one-half the length of the track member 262. One end of the cylinder 348 has a bracket member 352 extending therefrom and supported by a transverse shaft 354 extending between lower ends of the depending brackets 336—338. At the opposite end of the cylinder, the ram is connected with a block 356 on which is mounted a transverse shaft 358 having rollers 360 and 362 at its opposite ends. These rollers move between pairs of upper and lower track members or bars 364—366 and 368—370 (Fig. 23), which track bars extend between and are welded to the depending brackets 344—346 and 340—342.

Sprocket wheels 372 and 374 are rotatably mounted on the shaft 358 adjacent opposite ends thereof. Chains 376 and 378 respectively have ends fixed to lugs 380 and 382 shown in Fig. 22 and interconnected to the fixed bracket arms 344 and 346. These chains respectively extend from the lugs beneath and around the sprocket wheels 372 and 374 and then around sprocket wheels 384 and 386 rotatably mounted on the shaft 354. From the sprocket wheels 384 and 386, these chains extend to the carriage structure 264 and are secured to a transverse plate 388 thereof (Fig. 24). As indicated in Figs. 23 and 24, the chain 378 is connected to the plate member 388 by means of a stud 390 which is adjustably threaded into a lug 392 welded to the plate member, and the chain 376 is similarly adjustably connected to the plate member 388 by means of a stud 394 which is threaded into an apertured boss or lug 396. It is to be noted that when the ram 350 is fully retracted as shown in Fig. 22, the feeding jaw carriage structure 264 will be located at the extreme righthand end of the track member 226 as viewed in Fig. 24 so that it is in a position to start a feeding movement. When the ram 350 is extended, the sprocket wheels 372 and 374 are advanced toward the right as viewed in Fig. 22 so that the chains are operated to provide upper and lower runs thereof extending between the depending bracket arms 340—342 and 344—346. This, of course, causes shortening of the length of the chains extending from the sprocket wheels 384—386 to the carriage structure so that the carriage structure is fed or advanced substantially to these last mentioned sprocket wheels. With this arrangement, it will be appreciated that the length or movement of the carriage structure will be equal to twice the length of movement of the ram 350. In order to return the carriage structure after the feeding operation, another chain 398 is provided, which chain has an end portion secured to the carriage plate member 388 by a stud 400 which is threaded into a lug or apertured boss 402 (Fig. 24). This chain extends rearwardly from the carriage or oppositely from the chains 376 and 378 and around a sprocket wheel 404 rotatably supported by a shaft 405 mounted on the depending bracket arms 340 and 342. The chain 398 extends forwardly in the direction of feeding movement from the sprocket wheel 404 and around another sprocket wheel 405 which is rotatably supported by the shaft 358. From this last mentioned sprocket wheel, the chain 398 extends rearwardly and has an end fixed to a lug 408 mounted between the depending bracket arms 340 and 342 as shown in Fig. 24. It will be appreciated that when the ram is returned or retracted, the chain 398 will be operated so as to pull the feeding jaw carriage structure to the retracted or starting position.

As shown in Figs. 15 and 24, an annular stop member 410 is welded between lower ends of the depending bracket arms 340 and 342 for engaging the bearing portion 322 of the feeding jaw structure 298 when the carriage is shifted to the fully retracted position. This engagement causes the feeding jaw structures to be shifted forwardly with respect to the carriage along the rod 294. As a result, the portions 308 and 324 of the jaw structures ride up on the upwardly facing cam surfaces of their associated cam slots 290 and 292 so that the jaw to side walls of a housing structure 142 which, in turn, is supported in the manner described below, and the body means of the shearing head is provided with bearings 144 and 146 for rotatably mounting the body means on the cylinder 138.

It is to be noted that the rotatably supported shearing head may be turned to various positions so that, for example, the lateral opening 32 faces upwardly as shown in solid lines in Fig. 2 or sideways as shown in broken lines in Fig. 2 or downwardly as shown in Fig. 7. Such rotation of the shearing head through more than 270 degrees is accomplished by means of a rotary hydraulic motor 148 mounted within the housing structure 142. A pulley 150 is secured to the output shaft of the rotary hydraulic motor, and a flexible element or cable 152 which is wound in the form of a figure 8 (Fig. 6) extends around the pulley 150 and a circular member 154 which is fixed to the body means 130 of the shearing head and which encircles the non-rotatable hydraulic cylinder 138. Opposite ends of the cable are fixed to the pulley by suitable clamps 156, and an intermediate portion of the cable is secured to the member 154 by a clamp 158. It will be appreciated that this means for rotating the shearing head is of simple and rugged construction and may be easily maintained sufficiently clean so that its operation will not be mpaired.

The mechanism 60 for mounting the shearing head on the vehicle is shown in Figs. 1, 2 and 5–13. This mechanism is provided with a base member 160 which is detachably secured against the side of the sleeve 88 by means including a strap 162 which encircles the sleeve, see particularly Figs. 5, 7 and 9. A pair of oppositely disposed channels 164 and 166 extends laterally from the member 160, which channel members are welded to the member 160. Bearing assemblies 168 and 170 are respectively disposed at opposite sides of the channel members. Support members 172 are welded to the side of the channel member 164 and also to the shell of the bearing assembly 168, and similar support members 174 extend between and are welded to the channel member 166 and the shell of the bearing assembly 170. Rods 176 and 178 respectively extend through and are axially slidable within the bearing devices 168 and 170, which rods form a part of a carriage structure generally designated by the numeral 180, which carriage structure is shiftable to accomplish adjustment of the shearing head transversely of the longitudinal axis of the apparatus in the manner and for the purposes described below. This carriage also includes upstanding side plates 182 and 184 (Fig. 9) from which pairs of arms 186—188 and 190—192 extend respectively for connection with ends of the rods 176 and 178. Transverse members 192 and 194 extend between and are welded to the opposite side plates of the carriage. For a purpose more fully described below, the carriage is adapted to tilt yieldably relative to the axes of the bearing devices and this is accomplished by providing the bearing devices with resilient or rubber bushings 196 as indicated best in Figs. 9 and 10. As indicated best in Figs. 9 and 11, a fluid motor is provided for adjustably shifting the carriage, which motor includes a hydraulic cylinder 198 secured to the channel members, and a ram 200 pivotally connected as at 202 to lugs 204 welded to the transverse member 194.

The shearing head supporting mechanism 60 has a linkage system between the shearing head and the carriage structure 180 selectively for moving the shearing head to and from a retracted position shown in Fig. 7 and various extended positions such as that shown in Fig. 5. This linkage system comprises generally L-shaped members 206 and 208 respectively (Fig. 12) having ends pivotally connected to the side plates 182 and 184 by bearing means 210 and 212. Opposite or outer ends of the arms 206 and 208 are pivotally connected to a transverse shaft 214 which is interconnected with the housing structure 142 by bracket means 216. Bell cranks 218 and 220 are pivotally mounted intermediate their ends on a shaft 222 which extends between upper ends of the carriage side plate members 182 and 184. Ends of these bell crank members are respectively pivotally connected by pins 224 and 226 to links 228 and 230. Opposite ends of these links are respectively pivotally connected by pins 232 and 234 to short arms 236 and 238 which are secured to a shaft 240 extending between the L-shaped arms 206 and 208. In order to extend and retract the shearing head, a hydraulic motor is provided, which motor has a cylinder 242 pivotally connected by a pin 244 to the lugs 204 and a ram 246 which is pivotally connected to ends of the bell crank members 218 and 220 by a pin 248. It will be noted that when the double-acting cylinder is operated to retract the ram as shown in Fig. 5, the bell crank members 218 and 220 will be pivoted in a clockwise direction as viewed in Fig. 5 and the generally L-shaped arms 206 and 208 will be pivoted in a counter-clockwise direction so as to shift the shearing head toward an extended position. Alternatively, when the ram 246 is shifted toward the extended position shown in Fig. 7, the bell crank members are pivoted in a counterclockwise direction and the generally L-shaped arms are pivoted in a clockwise direction so as to raise the shearing head and shift it to a position over the central sleeve 88. In this retracted position, the shearing head is located within the outermost boundaries of the vehicle so that the vehicle may be transported from place to place without danger of the shearing head engaging any obstacle.

It will be appreciated that with the apparatus thus far described, the shearing head is adapted to pivot about the axis of the shaft 214 relative to the generally L-shaped arms 206 and 208. The mechanism 60 is provided with additional means which is adapted to maintain the shearing head so that its longitudinal axis is, for example, substantially horizontal in substantially all of the retracted and extended positions of the head, which means is also adapted to pivot the shearing head about the axis of the shaft 214, or to permit the shearing head to so pivot in order to locate the longitudinal axis of the shearing head at various angles inclined to the horizontal. This means comprises an arm 250 rigidly welded or otherwise secured to and extending upwardly from the housing structure 142. An upper end of the arm 250 is pivotally connected by pin means 252 to a ram 254 operating within a hydraulic cylinder 256. The cylinder, is, in turn, pivotally connected by a pin 258 disposed at right angles to the pin 252 to a link 260. The link 260 extends between the bell crank members 218 and 220 and is also pivotally connected to the shaft 222. It is to be noted that the axes of the shafts or pins 210, 214, 222 and 252 are substantially located at corners of a parallelogram in all positions of the linkage system, which linkage system is constructed so that with the ram 254 in the partially extended positions shown in Figs. 5 and 7, the longitudinal axis of the shearing head will be substantially maintained in a horizontal position in all retracted and extended conditions of the linkage system. However, as mentioned above, the shearing head may be tilted about the shaft 214 in either direction by extending or retracting the ram 254.

Referring now particularly to Figs. 2, 14–15 and 17–24, the means 62 for feeding successive sections of a fallen tree to the shearing head will be described. This means includes an elongated I-beam or track member 262 which is adjustably supported at the side of the vehicle in the manner described below. A carriage 264 is mounted on the track member for reciprocating movement, which carriage has opposite side members 266 and 268 (Fig. 23) extending along opposite sides of the track member 262 and carrying upper and lower sets of rollers 270 and 272 engageable with the upwardly and downwardly facing surfaces of the track member.

Spacer blocks 274 and 276 are respectively welded to lower marginal portions of the side members 266 and 268, and additional depending side members 278 and 280 are welded to and depend from the spacer blocks 274 and 276. Inwardly inclined or converging cam plates 282 and 284 are respectively welded to lower margins of the side members 278 and 280, and transverse channel members 286 and 288 extend between and are welded to opposite end portions of the cam plates 282 and 284. Similar but offset inclined cam slots 290 and 292 are respectively provided in the cam plates 282 and 284 for the purpose described below.

A rod 294 extends between and is secured to the transverse channel members 286 and 288 (Fig. 24) and also has a substantial portion extending outwardly of the member 288. Three engaging and feeding jaw structures 296 and 298 are pivotally and axially slidably mounted on the rod 294. As shown best in Figs. 15, 17, 21 and 24, the jaw structure 296 has a pair of axially spaced bearing portions 300 and 302 joined by a member 304 welded thereto and another laterally extending member 306 having a first portion 308 welded to the member 304 and projecting outwardly therefrom through the cam slot 290. The member 306 then extends outwardly and downwardly and has a lower end portion 310 which extends relatively sharply downwardly. A plurality of tooth elements 312, 314 and 316 is welded to the lower portions of the member 306, which tooth elements project inwardly from the member for biting into a tree. The lowermost element 312 is inclined upwardly as well as inwardly to facilitate lifting of the tree in the manner described below. A brace member 318 extends between and is welded or otherwise secured to the member 304 adjacent the bearing 302 and the lower and outer end portion of the member 306.

The jaw structure 298 is similar to the jaw structure 296 described above and need be only briefly described. Thus, the jaw structure 298 has bearing portions 320 and 322 (Fig. 24) slidably disposed on the rod 294 behind the bearing portions 300 and 302 respectively when considered with respect to the direction of movement of the jaw structures during feeding of the log. An axially extending member 324 (Fig. 17) similar to the member 304 extends between and is welded to the bearing portions 320 and 322, and a laterally extending member 326 (Fig. 17) which corresponds to the above described member 306 has a portion welded to the member 324 and extending outwardly through the cam slot 292 and additional downwardly and outwardly extending portions to which tooth elements 328, 330 and 332 (Figs. 18 and 19) are welded. This jaw structure is also provided with a brace member 334 which corresponds to the above described member 318. As shown best in Fig. 19, the tooth element 332 has a substantially V-shaped cross section which faces outwardly away from a tree to be engaged. The remaining tooth elements have similar transverse cross sections, and all of the tooth elements are provided with sharpened points. Considerable difficulty has been encountered in obtaining tooth elements which will bite into a tree with sufficient aggressiveness to prevent the jaw structures from slipping along the tree during a feeding operation. It has been found that these difficulties are substantially overcome by the tooth elements which are shown and described herein. It will be further appreciated that the generally V-shaped cross section of the tooth elements makes the tooth elements relatively rugged and resistant to bending.

Pairs of bracket arms 336—338, 340—342 and 344—346 (Fig. 22) are welded or otherwise secured to and depend from opposite ends and an intermediate portion, respectively, of the I-beam or track member 262. These bracket arms serve to support means which is adapted to traverse or actuate the feeding jaw carriage 264. This means comprises a hydraulic motor having a cylinder 348 and a ram 350 operable therein, which cylinder and ram have a length similar to one-half the length of the track member 262. One end of the cylinder 348 has a bracket member 352 extending therefrom and supported by a transverse shaft 354 extending between lower ends of the depending brackets 336—338. At the opposite end of the cylinder, the ram is connected with a block 356 on which is mounted a transverse shaft 358 having rollers 360 and 362 at its opposite ends. These rollers move between pairs of upper and lower track members or bars 364—366 and 368—370 (Fig. 23), which track bars extend between and are welded to the depending brackets 344—346 and 340—342.

Sprocket wheels 372 and 374 are rotatably mounted on the shaft 358 adjacent opposite ends thereof. Chains 376 and 378 respectively have ends fixed to lugs 380 and 382 shown in Fig. 22 and interconnected to the fixed bracket arms 344 and 346. These chains respectively extend from the lugs beneath and around the sprocket wheels 372 and 374 and then around sprocket wheels 384 and 386 rotatably mounted on the shaft 354. From the sprocket wheels 384 and 386, these chains extend to the carriage structure 264 and are secured to a transverse plate 388 thereof (Fig. 24). As indicated in Figs. 23 and 24, the chain 378 is connected to the plate member 388 by means of a stud 390 which is adjustably threaded into a lug 392 welded to the plate member, and the chain 376 is similarly adjustably connected to the plate member 388 by means of a stud 394 which is threaded into an apertured boss or lug 396. It is to be noted that when the ram 350 is fully retracted as shown in Fig. 22, the feeding jaw carriage structure 264 will be located at the extreme righthand end of the track member 226 as viewed in Fig. 24 so that it is in a position to start a feeding movement. When the ram 350 is extended, the sprocket wheels 372 and 374 are advanced toward the right as viewed in Fig. 22 so that the chains are operated to provide upper and lower runs thereof extending between the depending bracket arms 340—342 and 344—346. This, of course, causes shortening of the length of the chains extending from the sprocket wheels 384—386 to the carriage structure so that the carriage structure is fed or advanced substantially to these last mentioned sprocket wheels. With this arrangement, it will be appreciated that the length or movement of the carriage structure will be equal to twice the length of movement of the ram 350. In order to return the carriage structure after the feeding operation, another chain 398 is provided, which chain has an end portion secured to the carriage plate member 388 by a stud 400 which is threaded into a lug or apertured boss 402 (Fig. 24). This chain extends rearwardly from the carriage or oppositely from the chains 376 and 378 and around a sprocket wheel 404 rotatably supported by a shaft 405 mounted on the depending bracket arms 340 and 342. The chain 398 extends forwardly in the direction of feeding movement from the sprocket wheel 404 and around another sprocket wheel 405 which is rotatably supported by the shaft 358. From this last mentioned sprocket wheel, the chain 398 extends rearwardly and has an end fixed to a lug 408 mounted between the depending bracket arms 340 and 342 as shown in Fig. 24. It will be appreciated that when the ram is returned or retracted, the chain 398 will be operated so as to pull the feeding jaw carriage structure to the retracted or starting position.

As shown in Figs. 15 and 24, an annular stop member 410 is welded between lower ends of the depending bracket arms 340 and 342 for engaging the bearing portion 322 of the feeding jaw structure 298 when the carriage is shifted to the fully retracted position. This engagement causes the feeding jaw structures to be shifted forwardly with respect to the carriage along the rod 294. As a result, the portions 308 and 324 of the jaw structures ride up on the upwardly facing cam surfaces of their associated cam slots 290 and 292 so that the jaw structures are spread apart for readily receiving a tree or log therebetween.

When the rearward movement of the jaw structures is arrested by the stop 410, the jaw structures are releasably locked in the fully retracted position by a latch member 412. This latch member which is pivotally supported as at 414 has a hook portion 416 engageable with an upwardly projecting lug 418 on the bearing portion 302 of the jaw structure 296. Raising of the latch member 412 and thus release of the lug 418 is resisted by means of a stud 420 which extends through an apertured unthreaded lug 422 welded to the stop member 410 and which is threaded into a nut 424 welded to the latch. Jam nuts 426 are provided on the stud, which nuts may be adjusted to vary the normal amount which the latch member 412 may be pivoted in a clockwise direction as viewed in Fig. 24 without flexing thereof. The hook portion 416 of the latch member and the cooperating lug 418 have mating cam surfaces which are inclined so that when a predetermined force or pull is applied to the carriage structure 264 and, thus, to the feeding jaw structures, the hook portion 416 will be cammed or shifted so as to release the lug 418. This shifting of the latch member and release of the lug is, of course, obtained only after the force tending to pull the carriage structure 264 forwardly has been built up sufficiently to cause flexing of the latch member. It will be appreciated that the force required to release the latch means may be adjusted by adjustment of the stud 420 as described above.

It is to be noted that during initial extending movement of the ram 350 and before the latch 412 has been released, the carriage structure 264 will be moved forwardly while the jaw structures are retained against the forward movement. When such relative movement between the carriage and jaw structures occurs, the downwardly facing inclined cam edges of the slots 290 and 292 engage their associated portions 308 and 326 of the jaw structures so that the jaw structures are cammed toward each other and the tooth elements thereof are forced firmly into the tree as shown, for example, in Fig. 17. It will be appreciated that the structure is such that the tooth elements may be forced into a relatively large diameter tree as shown in Fig. 17 or into a smaller diameter portion of a tree as shown in Fig. 20. After the tooth elements are firmly embedded in the tree, the latch member 412 functions in the manner described above to release the lug 418 and the carriage and related elements are traversed to feed the tree toward the shearing head. The arrangement of the tooth elements and the jaw structures are such that once the tooth elements are firmly embedded in the tree in the manner just described, the weight of the tree and frictional resistance to its feeding movement serve to bias the jaw structures toward each other so that the tooth elements are continuously firmly urged into the tree until the return movement of the carriage structure 264 is begun. Then, the upwardly facing cam elements of the slots again function to spread the jaw elements apart to release the tree.

The track member 262 of the feeding mechanism has its opposite ends welded or otherwise secured to tubular elements or stub shafts 430 and 432 which are journaled in bearings 434 and 436, respectively, welded or otherwise secured to outer ends of support arm structures generally designated by the numerals 438 and 440. The arm structure 438 which is shown best in Fig. 17 includes a first section 442 having one end welded to a sleeve 444 pivotally disposed on an elongated torque tube 446 having its opposite ends rotatably supported in bearing means 448 and 450 as indicated in Fig. 2. The bearing means 448 is mounted on a suitable rigid and fixed structure 452 which is suitably welded or otherwise fastened to the vehicle frame. A link 454 is pivotally connected to an outer end of the member 442 by a pin 456, and a second pin 458 extending through this link member connects the link member to a pair of links 460 and 462. The links 460 and 462 are, in turn, pivotally connected as at 464 to ears 466 and 468 welded or, otherwise, fixed to the torque tube 446. Thus, any pivotal movement of the member 442 and, thus, the links 460 and 462 about the axis of the torque tube will be imparted to the torque tube and, in addition, any pivotal movement of the link 454 about the pivot pin 456 will cause rotation of the torque tube. It is to be noted that a stop element 470 is welded as at 472 to the member 442 and is adapted to engage a fixed abutment portion 474 of the support structure 452 when the member 442 is in a substantially horizontal position as shown in solid lines in Fig. 17. In addition, stop means 476 is welded to the member 442 for engaging the link 454 when the link is in the solid line position shown in Fig. 17 so as to prevent any further pivotal movement of this link about the pin 456 in a counterclockwise direction as viewed in Fig. 17.

A tubular arm member 478 is welded to an extends outwardly from the link means 454, and another tubular arm member 480 to which the bearing means 434 is welded is adjustably telescoped in the tubular member 478 and secured in position by bolt means 482. A hydraulic motor is provided for supporting and actuating the arm structure 438, which hydraulic motor comprises a double-acting cylinder 484 having one end pivoted to the support structure 452 by pin means 486. A ram 488 extending from this cylinder is pivotally connected as at 490 to the lower end structure means 492 secured to and depending from the tubular member 488. It will be noted that when the ram 488 is in an intermediate position as shown in solid lines in Fig. 17, the arm structure is supported in a substantially horizontal operative position with the axis of the tubular member 478 parallel to the axes of the members 442 and 460—462. The member 442 is prevented from pivoting below the solid line position shown by engagement of the stop 470 against the abutment 474, but the tubular arm member 478 and, thus, the feeding and gripping jaws may be lowered, if desired, for engagement with a tree or log by retracting the ram 488 from the intermediate position shown in solid lines so as to cause the tubular member 478 to pivot in a clockwise direction about the pin 456. It will be appreciated that the tubular member 478 and, thus, the gripping and feeding jaws may then be raised by extending the ram so that the member rotates in a counterclockwise direction about the pivot pin 456 until the link 454 engages the stop 476. When such engagement is obtained, further extension of the ram 488 causes the entire arm structure 438 to pivot about the axis of the torque tube toward the position shown in broken lines in Fig. 17. In this broken line position, the feeding means is retracted so that it no longer extends laterally beyond the outer margins of the wheels of the vehicle so that the apparatus is more compact and is adapted to be driven over public roads.

The arm structure 440 (Fig. 2) is identical to the arm structure 538 to that it need not be described in detail. However, no separate fluid motor is provided for actuating the arm structure 440. This arm structure is actuated by the torque tube 446 which, in turn, is rotated by the arm structure 438 which is connected thereto by the lugs or ears 466 and 468 in the manner described above. As shown generally in Fig. 2, the arm structure 440 is provided with a member 494 corresponding to the member 442 described above, members 496 and 498 connected between the link 500 and ears 502 and 504, which elements are identical respectively to the above described members 460—462, links 454 and ears 466 and 468. The arm structure 440 is also provided with tubular members 506 and 508 which correspond to the above described members 478 and 480. It will be noted that the track member 262 of the feeding mechanism is connected to the members 480 and 508 so that the track member is freely pivotally supported to enable the jaw structures to remain in a depending position in all extended and retracted positions of the arm structures 438 and 440.

The means 64 for skinning branches from the tree is shown in Figs. 2, 14, 15, and 16 and comprises a pair of brace members 510 and 512 which are welded to each other and to the tubular support arm member 506 and extend for locating a pivot portion 514 (Fig. 14) of the member 510 so that it is disposed substantially in a vertical plane that also bisects the track member 262 of the feeding means. Arcuate members 516 and 518 are connected to the pivot portion 514 by a pin 520 and are adapted adjustably to encircle trees of various diameters with a relatively close fit. Handle portions 522 and 524 extend upwardly from the members 516 and 518 respectively for facilitating opening of the members 516 and 518 to receive a tree therebetween and subsequent closing of the members around the tree. It will be appreciated that the handle portions will be pushed away from each other to open the members 516 and 518. It is contemplated that the handle portions may be manually operated, or, if desired, a fluid motor including a cylinder and ram, respectively, pivotally connected to the handle portions may be provided for opening and closing the members 516 and 518. In the embodiment shown a bar 526 is pivotally connected as at 528 to the handle portion 522 and is provided with a series of notches 530. These notches are adapted selectively to receive a pin 532 extending from the handle portion 524 for locking the members 516 and 518 in any desired adjusted position around a tree. Blade elements 534 are secured to the arcuate portion of the member 516, and similar blade segments 536 are secured to the arcuate portion of the member 518. These blade elements or segments are arranged so that when the members 516 and 518 are disposed in a closed or overlapping condition as shown, for example, in Fig. 16, the blades present a substantially continuous annular cutting edge spaced slightly from the surface of the tree trunk. Thus, when the tree is advanced by the feeding means, it will be pulled through the ring of blade elements and any branches projecting laterally from the tree trunk will be sliced therefrom.

The means 66 for loading severed tree sections or logs onto the cart structure 56 is supported by a rigid upstanding post 540 welded or otherwise secured to the frame of the cart. As shown in Fig. 2, the means 66 is adapted to grip a section of a tree to be severed adjacent the mid-portion of the tree section and relatively close to the shearing head. This necessitates subsequent movement of a gripping head portion 542 of the loading means rearwardly as well as laterally in order properly to position a severed tree section over the cart. It is important to note that the structure is such that the axis of the tree section being loaded into the cart will always remain substantially parallel to the longitudinal axis of the vehicle and the cart portion thereof so that all of the logs deposited in the cart will be substantially parallel to each other and to the axis of the vehicle. In order to promote proper positioning of the log sections on the cart, the structure is such that the gripping head portion 542 thereof will move first diagonally rearwardly and then laterally substantially perpendicularly to the longitudinal axis of the vehicle along a path of travel indicated by a broken line designated by the numeral 544 in Fig. 2.

Referring now more specifically to Figs. 1, 2, 25 and 29—31 wherein the loading means 66 is shown in detail, it is seen that the gripping head portion 542 comprises a pair of opposing jaw structures 546 and 548 (Fig. 30) having adjacent ends supported by pivot means 550. The jaw structures are adapted to be closed for gripping a tree by a fluid motor including a hydraulic cylinder 552 pivotally connected to the jaw structure 548 as at 554, and a ram 556 pivotally connected to an ear 558 extending from the jaw structure 546 by a pin 560. Resilient means is provided for opening the jaw structures when the fluid pressure in the cylinder 552 is relieved, which resilient means includes a heavy spring 562 extending from a pocket member 564 pivotally connected to the jaw structure 548 as at 566. The spring also encircles a rod 568 which is pivotally connected to the jaw structure 546 by a pin 570.

The gripping head pivot means 550 is pivotally carried at ends of links 572 and 574 having diagonally bent opposite end portions (Fig. 31) pivotally connected to ears 576 and 578 of a bracket 580 by pin means 582. The bracket 580 is welded or otherwise secured to an outer end of a boom arm 584 having a first portion 586 extending generally transversely of the longitudinal axis of the vehicle and an outer end portion 588 which extends generally at right angles from the portion 586. The boom is raised and lowered by the means and in the manner described below, and it will be appreciated that as the boom is raised and lowered, the gripping head 542 will pivot about the pivot means 550 and the links 572 and 574 will pivot about the pin 582. The positions of the axes of the pivot means 550 and 582 are correlated with each other and with the mechanism for pivoting the boom so that the axis of the pivot means 550 will always be substantially parallel to the longitudinal axis of the vehicle.

The inner end of the boom 584 is welded to a pair of oppositely disposed members 590 and 592. An intermediate portion of the member 590 adjacent its outer end is pivotally connected by pin means 594 to one end of a link 596 having an opposite bent end portion 598 pivotally connected by a pin 600 to an inclined ear 602 welded or otherwise secured to the upstanding post 540. The member 592 extends beyond the member 590 and has an end portion 604 which is generally hooked or, in other words, extends laterally of the narrow edge of the member 592 and which is also twisted so that it is disposed in a plane substantially parallel to the planes of the elements or portions 598 and 602 when the various parts are in the positions shown in Figs. 30 and 31. The end portion 604 is pivoted by a pin 606 to a similarly disposed end portion 608 of a link 610. An opposite end of the link 610 is connected by pivot pin means 612 to the outer end of a support arm 614 rigidly welded or otherwise secured to transverse channel members 616 which are, in turn, welded to the upstanding post 540. This mechanism is actuated by means of a fluid motor which comprises a hydraulic cylinder 618 mounted to a brace structure 620 which is secured to the upstanding post 540. A ram 622 extending from the cylinder has its outer end connected by universal joint means 524 to parallel portions of the members 590 and 592. The cylinder is also pivotally connected to the frame structure 620 by pin means 626.

When the ram 622 is extended about half way as shown best in Figs. 30 and 31, an abutment or stop element 628 welded to the link 596 is in engagement with the lower edge of the fixed arm 614 so that the link 610 is restrained against any further pivotal movement about the pin 612 in a counter-clockwise direction as viewed in Fig. 30. Furthermore, it is to be noted that with the parts in these positions, the pivot pins 594 and 612 are in axial alignment with each other and are substantially parallel to the longitudinal axis of the vehicle and the pivot pins 600 and 606 are substantially in axial alignment with each other but are inclined in both horizontal and vertical directions with respect to the longitudinal axis of the vehicle. It is also to be noted that the boom is in a substantially vertical position. In order to lower the gripping head to an extended position for gripping a tree section, the double-acting hydraulic cylinder 618 is operated so as to retract the ram. This causes the links 596 and 592 to pivot downwardly about the pins 600 and 606, and since these pins are inclined in the manner described above, the boom is lowered and moved forwardly so that the gripping head is caused to follow the oblique portion of the path of travel 544 indicated in Fig. 2. While the boom is located in any of the positions laterally outwardly and downwardly of the substantially vertical dead center position shown in Figs. 1, 30 and 31 and also in the intermediate full line position in Fig. 29, the ram 622 will be under compression from the load carried by the gripping head. However, in these positions the ram is substantially retracted at least half way so that it may be made relatively light in weight without being subject to bending.

In order to shift the boom in a clockwise direction as viewed in Fig. 30 from the position shown in Fig. 30 whereby to shift the gripping head over the cart, the hydraulic cylinder 618 is actuated so as to extend the ram. When this is done the link 610 pivots about the pin 612 so that the pivot pins 600 and 606 are no longer in alignment and as a result, the boom pivots about the aligned pins 594 and 612. Since these pins are parallel to the longitudinal axis of the vehicle, the boom is moved so that the gripping head travels along the portion of the path of travel 544 which extends perpendicular to the longitudinal axis of the vehicle. It is to be noted that during this movement of the mechanism, the ram 622 is extended more than half way but is under tension from the load carried by the gripping head so that any possibility of bending of the ram is minimized. It is further to be noted that with the mechanism for actuating the boom 584 just described, only a single hydraulic motor having a reciprocable ram is needed for moving the gripping head through substantially more than 180 degrees to and from the fully extended and fully retracted positions respectively shown as the right and left-hand broken line positions in Fig. 29.

The cart structure 56 is provided with a pair of generally U-shaped end members 640 and 642 which are joined by a plurality of transverse members 644, 646, 648 and 650 (Fig. 2) extending therebetween and welded thereto. This body portion of the cart is adapted to be tilted for dumping the log sections onto the ground with the log sections standing on end. This is accomplished by providing a pair of upstanding members 652 and 654 (Fig. 25) having their upper ends welded to the transverse members 646 and 648 and having their lower ends pivotally connected to the cart frame as at 656 and 658. Hydraulic motors 660 and 662 having cylinders and reciprocable rams are respectively pivotally connected to the members 652 and 654 and pivotally connected to the cart frame for raising the body of the cart to the position shown from a tilted long dumping position.

In order to retain logs in a bundle while they are being dumped from the cart on end onto the ground, a chain 664 is provided, which chain has one end connected to a tightening mechanism shown in Figs. 1, 2 and 25—28 and being adapted to be placed over a group of logs on the cart body and hooked over a lug 666 (Fig. 2) or the like on the member 650 of the cart body. The tightening mechanism has a bell crank 668 (Fig. 26) having one end connected to the chain which bell crank is mounted so that its pivotal axis will automatically adjust in accordance with the direction of pull of the chain 664 so as to minimize bending stresses on the bell crank. More specifically, the bell crank is pivotally mounted intermediate its ends by a pin 670 which extends into an ear 672 mounted on a sleeve 674. The sleeve 674 is rotatably mounted on the tubular cart body member 644 and is retained against axial movement thereon by collars 676 and 678. It will be appreciated that the sleeve 674 and thus the pivotal mounting of the bell crank will rotate about the supporting cart member 644 when the chain 664 is placed under tension so that the pivotal axis of the bell crank will be substantially perpendicular to the direction in which the chain pulls on the crank. In order to actuate the bell crank for tightening the chain, a fluid motor is provided which has a hydraulic cylinder 680 pivotally connected by a pin 682 to an ear 684 welded to and depending from the sleeve 674. A ram 686 extending from the hydraulic cylinder is pivotally connected to the bell crank as at 688. The bell crank is returned when pressure in the cylinder is relieved by means of a spring 690 extending between the crank and the ear 684. It will be appreciated that during loading of the logs onto the cart, the chain 664 will be moved out of the way and that after the desired number of logs has been placed on the cart, the chain will be extended over the logs and hooked over the lugs 666. Then the hydraulic cylinder 680 is actuated to turn the bell crank and tighten the chain. While the cart is tilted to place the logs on the ground, the chain is maintained around the logs until they have been bound together by suitable tying means. This may be readily and economically accomplished by means of relatively lightweight sheet metal straps, wires or the like. Preferably such a tying element is placed in a storage magazine on the cart, which magazine is provided by a plurality of generally U-shaped outwardly facing channel members 692, 694 and 696 (Fig. 25) welded to the inner side of the end member 640 of the cart body. With the tying element placed in the magazine, the logs are loaded onto the cart and over the tying element so that it is merely necessary to bring the ends of the tying element together to secure the logs in a bundle when they have been deposited on the ground and while they are being retained by the chain. After the ends of the tying element are secured together, the chain is released and the cart is returned to its raised position.

The cart body is normally retained in the elevated position shown in the drawings by latch means generally designated by the numeral 698 in Figs. 1 and 2 and shown in detail in Figs. 32–34. The latch means 698 is provided with a base plate 700 which is adapted to be welded or otherwise secured to the frame of the cart. A channel-shaped slide member 702 is slidably disposed on the base member 700 and is confined between a pair of upstanding posts 704 and 706 respectively welded or otherwise secured to opposite margins of the base member between opposite ends thereof. A rigid bridge or transverse means comprising members 708, 710 and 712 extends between and is secured to the upper end of the posts 704 and 706. Latch elements or hooks 714 and 716 are welded to the slide for releasable engagement with a bar 718 secured to the member 640. A spring 726 acts between the depending bridge element 712 and a transverse member 724 between the latch elements for normally biasing the slide and latch elements to a position for latching engagement with the bar 718. A hydraulic cylinder 728 is disposed between the depending bridge element 712 and another transverse member 730 (not shown in Fig. 34) extending between and welded to ends of the slide member side flanges. A ram 732 operating within the cylinder 728 acts against the bridge means when fluid under pressure is introduced into the cylinder for retracting the slide and latch elements to release the bar 718 and permit the cart to tilt.

In order to steer the vehicle, means is provided for turning the tractor portion about a vertical axis relative to the trailing cart portion. As shown in Fig. 2, this means includes hydraulic cylinders 734 and 746 pivotally connected to opposite sides of the tractor frame and having rams 738 and 740, respectively, pivotally connected with ears 742 and 744 secured to the member 72. It will be appreciated that when the ram 738 is extended and the ram 740 retracted, the vehicle will turn toward the right, and when the ram 740 is extended and the ram 738 retracted, the vehicle will turn toward the left.

In accordance with a feature of the present invention, novel means is provided for directing fluid under pressure to the cylinders 734 and 736 for steering the vehicle. This means, which is shown in Figs. 1 and 35–39, includes a valve 746 (Fig. 36) having an axially shiftable stem 748. This valve is of known construction and need not be described in detail. It suffices to state that the valve is constructed and connected with the cylinders so that when the stem 748 is pulled outwardly fluid is directed to the cylinders for causing the vehicle to turn toward the right, and when the stem 748 is pushed inwardly from the position shown in Fig. 36, fluid is directed to the cylinder so as to cause the vehicle to turn toward the left.

The novel means for actuating the valve stem 748 includes operating levers 750 and 752 connected to a base member 754 for pivotal movement about a common axis 756. The base member 754 is secured by any suitable means to a panel 758 of the tractor. A short link 760 is pivotally connected to an outer end of the stem 748 by a pin 762 and is also pivotally connected by means of pin 764 with upper corner portions of generally triangular links 766 and 768. A pair of identical links 770 and 772 is provided which links have ends pivotally connected to opposite margins of the base member 754 for movement about a common axis 774. Opposite ends of the links 770 and 772 are respectively pivotally connected to the links 766 and 768 for movement about an axis 776 which is also the center of the generally triangular links. Identical links 778 and 780 are respectively pivotally connected to the laterally extending portions of the operating levers 750 and 752 by pins 782 and 784, which pins are equally spaced from the axis 756. Opposite ends of the links 778 and 780 are respectively pivotally connected to the corners of the triangular links 768 and 766 at opposite sides of the center 776 by pins 786 and 788. Springs 790 and 792 are connected between the operating levers 750 and 752, and protuberance means 794 secured to the tractor panel 758 for normally biasing the operating levers in a clockwise direction as viewed in Fig. 36 and against a fixed stop 796 secured to the base member 754. Another fixed stop 798 is provided beneath the levers for limiting movement thereof in a counterclockwise direction.

The operation of the lever mechanism is illustrated in Figs. 37–39. When, for example, it is desired to turn the vehicle toward the right, the right hand lever 750 is pulled downwardly as shown in Fig. 37. This causes the link 778 to pivot the triangular links in a counterclockwise direction as viewed in this figure, substantially about the pivot pin 788. This causes the pin 764 to swing outwardly from its position above the center line of the stem 748, so that the stem 748 is also shifted outwardly. Similarly, the lever 752 may be pulled outwardly and downwardly from the position shown in Fig. 36 toward the position shown in Fig. 39 for shifting the valve stem 748 inwardly and thereby cause the vehicle to turn toward the left. When the lever 752 is pulled downwardly in this manner while the lever 750 remains in the raised position, the link 780 pulls downwardly on the inner corner of the triangular link 756 so as to cause the triangular links to pivot substantially about the axis of the pin 786, whereby the pin 764 is moved inwardly and downwardly from its normal position.

An important feature of the novel linkage mechanism is illustrated in Fig. 38. In this figure both of the operating levers 750 and 752 have been pulled downwardly the same amount. When this is done, the triangular links are moved downwardly without pivoting about either of the pins 786 or 788. These triangular links are, however, moved in an arc about the pivotal axis 774 of the links 770 and 772, and the links 778 and 780 similarly are bodily moved in an arc about the axis 756. The arrangement and movement is such that the pivot pin 764 at the upper corners of the triangular links moves in an arc having as its center the axis of a pivot pin 762, whereby the valve stem 748 remains stationary. In other words, the arrangement is such that the handle members or operating levers 750 and 752 may be moved in unison to any position between the stops 796 and 798 without shifting the valve stem 748. It is further to be noted that with the operating levers in the position shown in Fig. 39, for example, which is the lowermost possible position for the handles, upward movement of the lever 750 will cause inward movement of the valve stem and thus turning of the vehicle toward the left while upward movement of the lever 752 will cause outward movement of the valve stem and turning of the vehicle toward the right. When the operating levers 750 and 752 are in an identical intermediate position between the stops, which position is not shown, turning of the vehicle toward the right may be accomplished either by pulling down on the lever 750 or raising the lever 752, and turning of the vehicle toward the left may be accomplished either by pulling down on the lever 752 or raising the lever 750. An important practical result is that an operator does not, for example, have to position the right hand operating lever all the way forwardly before the left hand lever can be operated to turn the vehicle toward the left, and, in fact, an operator may simply grasp both of the levers with one hand and may steer the vehicle merely by twisting his hand to move the levers back and forth relative to each other.

As shown in Fig. 1, the tractor portion of the vehicle is provided with the usual gear shift lever designated by the numeral 800. It has been found that while the vehicle is being operated, the driver may accidentally trip the gear shift lever so that it is inadvertently knocked from a drive position to a neutral position. In order to prevent such accidental shifting of the gear shift lever 800, the apparatus is provided with shiftable stop means 802 shown in Figs. 40 and 41 (sheet 12) which is selectively positionable for retaining the gear shift lever in a desired position. This stop mechanism comprises a base plate 804 secured to the vehicle adjacent the gear shift lever and having upstanding apertured plate members 806 and 808 welded to its opposite ends. A bolt 810 extends through the apertured members 806 and 808 and over the bolt is positioned bracket means including upstanding side members 812 and 814. An arm structure 815 including opposite side members 816 and 818 pivotally connected to the bracket members by a pin 820 is provided for selective movement between the inoperative broken line position shown in Fig. 40 and the outwardly extending operative position shown in solid lines. The outer ends of the members 816 and 818 are joined by a transverse member 822 welded thereto. The stop arm structure 815 is normally biased toward the broken line position by a spring 824 extending between a pin 826 connected to outer end portions of the members 816 and 818, and a pin 828 connected between the bracket side members. A bar 830 is welded to margins of inner end portions of the members 816 and 818 and extends laterally therefrom to facilitate a shifting of the arm structure and also to provide a stop engageable with edges of the bracket side members for limiting pivotal movement of the arm structure in a clockwise direction as viewed in Fig. 40.

A hydraulic system for operating the apparatus described above is diagrammatically shown in Fig. 42. This system is provided with a first pump 840 having an inlet side thereof connected with a hydraulic reservoir 842 by a line 844. Hydraulic fluid under pressure is directed from this pump by power line 846 for actuating one group of the above mentioned hydraulic cylinders. More specifically, the line 846 extends to a one-way check valve 848 having an outlet connected with a manifold 850. The line 846 is connected also to a branch line 852 with a relief valve 854 which has an outlet connected by drain lines 856 and 858 with an inlet of a heat exchanger 860 which in turn is connected to the reservoir by a drain line 862. Manually operable control valves 864, 866, 868, 870, 872 and 882 are respectively associated with the cylinders 484, 242, 256, 198, 618 and 552, which valves have ports connected with the power manifold 850 and with the above mentioned drain lines. More specifically, the power manifold 850 is connected with inlet ports of the valves 864 through 882 by branch lines 884, 886, 888, 890, 892 and 894, respectively. A drain manifold 896 is connected with the drain line 858 by a branch line 898, and with the above mentioned valves by branch lines 900, 902, 904, 906, 908 and 910.

Each of the above mentioned valves has a neutral position in which fluid is not directed to either end of its associated cylinder, and in order to reduce power requirements and heating of the fluid which occurs when the fluid is discharged through the relief valve 854 when all of the above mentioned control valves are in a neutral position. These control valves are provided with ports which are connected in series with each other and with the branch power line 852 and the drain line 898. More specifically, a line 912 extends from the branch power line 852 to a passageway in the valve 864, and a line 914 extends from the passageway to a similar passageway through the valve 866. A similar line 916 extends from the valve 866 to a passageway through the valve 868 and corresponding lines 918, 920 and 922 extend between passageways in their associated valves. Another line 924, extends between the outlet of this passageway in the valve 882 and the drain line 894. It is understood that the structure of the valve is such that when they are all in a neutral position, the fluid may flow freely from the line 852 through the series connected valve passageways to the drain line. However, when any one of these valves is shifted to an operating position the above mentioned passageway therethrough is blocked so that the connection with thee drain line is severed and the fluid under pressure is directed through the check valve 840, the power manifold 850 and to the power inlet ports of all of the valves.

The valve 864 has additional ports respectively connected with opposite ends of the cylinder 484 by lines 926 and 928, and it is understood that this valve structure is such that it may be selectively shifted from a neutral position for connecting either the power line 884 or the drain line 900 with either of the lines 926 and 928 for operating the piston in the cylinder 484 selectively in opposite directions. Similarly the valve 866 has additional ports connected with opposite ends of the cylinder 242 by lines 930 and 932 and this valve may also be operated selectively from the neutral position to direct hydraulic fluid under pressure to opposite ends of the cylinder 242. Opposite ends of the cylinder 256 are similarly connected by lines 934, 936 with ports of the valve 868 which valve may also be operated selectively for introducing fluid under pressure into opposite ends of the cylinder. It is further to be noted that this valve has, in addition to its neutral and two operative positions another position in which the central drain passageway connected with the lines 916 and 918 remains blocked, and the lines 934 and 936 are connected with each other and blocked from the power and drain lines 888 and 904. With the control valve shifted to this last mentioned position, the piston in the cylinder 256 is free to shift back and forth in accordance with external forces applied to the piston in the manner and for the purpose described below. This enables the shear engaged in a tree or trunk to follow the movement of said tree or trunk to a limited extent.

The cylinder 198 is connected with additional ports of the valve 870 by lines 938 and 940 and it is to be noted that the valve 870 is identical to the valve 868 so that it may be shifted to permit the piston and the cylinder 198 to shift back and forth in the manner described below. The cylinder 618 is also a double acting cylinder and has opposite ends connected with ports of the valve structure 872 by lines 942 and 944, but this valve 872 is identical to the valves 864 and 866 mentioned above and does not have the fourth position of the valves 868 and 870. The cylinder 552 is a single acting cylinder and has only one end thereof connected by a line 946 with a port of the valve structure 882 which port is adapted selectively to be connected with the power and drain lines.

The hydraulic system is provided with a second relatively large capacity high pressure pump 948 which, like the pump 840 mentioned above is adapted to be driven from a suitable power takeoff from a tractor engine. The pump 948 has an inlet connected by a line 950 to the hydraulic reservoir and an outlet connected by a line 952 with one port of a control valve 954 associated with the shearing blade actuating cylinder 138. The line 952 is also connected by a branch line 956 with a relief valve 958 having an outlet connected to the drain by a line 960. The relief valve 958 may, for example, be set to "open" when the hydraulic pressure in the line 956 exceeds 3000 p.s.i., while the above mentioned relief valve 854 may be set to "open" at a substantially lower pressure such, for example, as about 1450 p.s.i.

The manually operable control valve 954 has a drain port connected by line 962 to the drain line 858 and has additional ports respectively connected with opposite ends of the cylinder 138 by lines 964 and 966. It will be appreciated that the valve 954 is constructed so as to selectively connect the power and drain lines 952 and 962 with the lines 964 and 966. The power line will be connected with the line 966 during a shearing operation.

In accordance with an important feature of the present invention, it is to be noted that a branch line 968 is connected with and extends from the line 966 to a pressure reducing valve 970. The pressure reducing valve has an outlet connected by line 972 with a check valve 974 which in turn is connected by line 972 with the line 930 by a line 976. A line 978 extends from a connection with the line 932 to a pressure operated unloading valve 980 which is normally closed and which has an outlet connected by a line 982 to a drain line 984 which in turn is connected with the drain line 858. A pilot line 986 extends from the line 968 adjacent the pressure reducing valve 970 to the unloading valve 980 for actuating the unloading valve from a closed to an open position.

When it is desired to fell a standing tree, the shearing head is shifted from its retracted position to an extended position by operating the valve 866 so as to direct hydraulic fluid under pressure through the line 932 to the rod end of the cylinder 242 so that the ram therein is retracted to extend the parallelogram-like shearing head supporting mechanism. The shearing head is then rotated to the desired position by means of the above mentioned rotary motor 148, and, if necessary, the valve 868 is operated to introduce hydraulic fluid under pressure to the cylinder 256 to adjust the angular position of the shearing head about the pivot pin 214, and the valve 870 may be actuated to introduce hydraulic fluid under pressure into the cylinder 198, for bodily shifting the shearing head and parallelogram-like supporting mechanism therefor laterally to a desired position. The vehicle is then maneuvered so as to cause the tree to be severed to enter the lateral opening in the shearing head. The tree may now be severed by operating the valve 954 so as to deliver hydraulic fluid under pressure through the line 966 to the head end of the shearing head cylinder 138. However, in accordance with an important feature of the present invention before any substantial shearing is accomplished the valves 868 and 870 are manually shifted to their above-mentioned fourth positions in which the lines to their associated cylinders are connected with each other rather than with either the power or drain lines whereby the pistons in their associated cylinders are free to shift back and forth in response to any forces imparted thereto as a result of engagement of the shearing head and shearing blade with the tree. It is also to be noted that when the shearing operation is begun, the hydraulic fluid under pressure is directed not only into the line 966 but also into the line 968. A portion of the fluid flows through the pressure reducing valve 970 and the check valve 974 to the line 930 which at this time is connected with the drain. Another portion of the fluid in the line 968 is directed through the pilot line 986 for shifting the unloading valve 980 to an open position so that the line 932 will also be connected to the drain. As a result, both ends of the cylinder 942 will be connected with the drain so that the piston therein is also free to shift back and forth in accordance with external forces applied thereto. It will be appreciated that with this structure the shearing head and supporting mechanism therefor is free to move back and forth, and the parallelogramlike frame mechanism is free to extend or retract and the shearing head is free to pivot about the pin 214, to accommodate the various forces imposed on the mechanism during a shearing operation. The latter movement just mentioned is particularly important since it has been found that the trailing portion of the shearing blade inherently tends to rise during a tree felling operation so that if the blade is held rigidly in a manner which prevents such rising, it will be subjected to considerable bending stresses and may be damaged and in addition the power requirements for severing the tree may be increased. Another advantage of permitting the shearing head to pivot about the pin 214 during the tree felling operation is that the blade is maintained in engagement with the severed portion of the tree, and at a more effective angle for controlling the direction of fall of the tree. In some instances, if desired, the cylinder 256 may even be positively operated to tilt the shearing head about the pin 214 for controlling the direction of fall of the tree.

The hydraulic system is provided with a third pump 988 also driven from a suitable power takeoff from the vehicle engine and having an inlet connected by a line 990 to the line 844 and an outlet connected by line 992 with an inlet of a one-way check valve 994. A branch line 996 extends from the line 992 to a pressure relief valve 998 having an outlet connected with a drain line 1000 which in turn is connected with the above mentioned drain line 984. An outlet of the check valve 994 is connected with a pressure manifold 1002 which in turn is connected with branch lines 1004, 1006, 1008, 1010 and 1012, respectively, extending to inlet ports of the valve 746 and valves 1014, 1016, 1018 and 1020. These valves are similar to the above described control valves in that they have transverse passageways which are open when the valves are in neutral, which passageways are connected in series with the line 996, with each other and with a drain manifold 1022 by lines 1024, 1026, 1028, 1030, 1032 and 1034. The valves are also respectively provided with drain ports connected with the drain manifold 1035 by branch lines 1036, 1038, 1040, 1042 and 1044.

The valve 746 has additional ports connected by conduits 1046 and 1048 and several branch conduits with opposite ends of the steering cylinders 734 and 736. It is important to note that an adjustable orifice or valve 1050 is connected in the line 1046 so that the rate of flow of the hydraulic fluid to or from the cylinders at the normal operating pressure may be varied. For example, by opening the valve 1050 the rate of flow to the cylinders may be increased so that rapid steering response is obtained, which rapid response is especially suitable when the vehicle is being driven at relatively slow speeds through a forest or over rough terrain or the like. On the other hand, such rapid response is undesirable when the vehicle is being driven at a relatively high speed over a highway or the like and the rapid response or sensitivity of the steering may be decreased by partially closing the valve 1050.

The valve 1014 is associated with the cart dumping cylinders 660 and 662 and with the latch cylinder 728, and is connected with the cylinders by lines 1052 and 1054 and suitable branch lines. Similarly, the valve 1016 is associated with the rotary hydraulic motor and is connected with the cylinders by lines 1052 and 1054 and suitable branch lines. Similarly, the valve 1016 is associated with the rotary hydraulic motor 148 and is connected thereto by lines 1056 and 1058, and the valve 1018 is connected with opposite ends of the tree feeding cylinder 348 by lines 1060 and 1062. The single acting load binder or chain tightening cylinder 680 is connected with the valve 1020 by a line 1064.

In accordance with the present invention, a standing tree is harvested in the following manner. The vehicle is driven to a location adjacent a tree to be felled whereupon the shearing head is brought into engagement with the tree in the manner described above. After the shearing blade has been actuated to fell the tree, the vehicle is maneuvered so that it extends parallel to the fallen tree and so that the gripping jaws of the feeding means are located over a portion of the tree trunk spaced from its severed end a distance similar to the length of the section to be severed from the tree. Then the cylinder 484 is actuated to lower the feeding mechanism to bring the jaws thereof into engagement with the tree. When the teeth of these jaws engage the tree reverse operation of the cylinder 484 to lift the jaws causes the teeth to bite into the tree as mentioned above so that the tree will be lifted. In the meantime the shearing head has been rotated so that its lateral opening faces upwardly as shown in Fig. 2 and so that its closed side is resting on the ground. The inner margin of the shearing head will provide a relatively smooth hard bearing surface over which the tree may be relatively easily advanced. It is to be understood, however, that if desired the tree may be bucked or sectionalized with the shearing head disposed so that the lateral opening therein faces downwardly. After the end portion of the tree has been lifted above the ground, the jaw members of the branch skinning means are adjusted around the tree and locked in the desired adjusted position. Then the cylinder 348 is actuated for feeding a desired length of the tree through the shearing head opening. At this time the loading boom is preferably lowered and the loading gripping head is passed around the advanced section of the tree and caused to grip this section so as to maintain continuous positive control over this portion of the tree. Then the shearing blade is actuated and while severing the tree is taking place the feed cylinder 348 is operated so as to return the feeding jaws to their starting positions. Upon completion of the severing operation, the loading means is actuated so that the severed tree section is raised and deposited in the cart in the manner described above and at the same time the shearing blade is retracted and the feeding cylinder 348 is operated to advance the next section of the tree. It will be appreciated that these steps are repeated until the entire tree is sectionalized or the cart is loaded, and in either event a considerable number of tree sections may be severed from a tree and loaded into the cart without requiring the vehicle to be maneuvered over the ground. When the cart is loaded, the chain 664 is drawn over the pile of logs therein and the cart is manipulated to dump the pile of logs on the ground so that the logs stand on end. Then the logs are tied together by a wire or other suitable element in the manner described above to await further transportation.

While a preferred embodiment of the present invention has been shown and described herein, it is obvious that many details may be changed without departing from the spirit and scope of the appended claims.

The invention is claimed as follows:

1. An apparatus for harvesting trees comprising a mobile unit, means mounted on said unit and selectively positionable for severing a standing tree and for severing sections from a fallen tree, said unit including means for receiving and retaining a plurality of log sections, substantially horizontally reciprocable means on said unit for positively controlling and feeding a fallen tree to position successive substantially predetermined sections of said fallen tree to be severed by said severing means, and means on said unit for picking up and positively positioning a tree section substantially as it is severed and for loading the tree section onto said receiving and retaining means of the unit with successive tree sections disposed in substantially parallel relationship.

2. An apparatus for harvesting trees comprising a longitudinally movable unit, means mounted on said unit and projecting laterally of a longitudinal axis of said unit and selectively positionable for severing a standing tree and for severing sections from a fallen tree, said unit including means for receiving and retaining a plurality of log sections, means on said unit and reciprocable substantially parallel to the longitudinal axis of said unit for feeding a fallen tree to position successive sections of said fallen tree to be severed by said severing means, and means on said unit and adapted to extend laterally of said longitudinal axis for loading a tree section substantially as it is severed onto said receiving and retaining means of the unit and for positively positioning each tree section so that the loaded tree sections are disposed substantially parallel to each other.

3. An apparatus, as defined in claim 2, wherein said loading means includes a tree section gripping head for positively retaining a tree section in predetermined position relative thereto, and means for moving said gripping head to and from tree section pickup and discharge positions while maintaining said gripping head in a predetermined manner so as to facilitate loading of a plurality of log sections in a predetermined arrangement onto said receiving and retaining means.

4. An apparatus for harvesting trees comprising a mobile unit, means mounted on said unit and selectively positionable for severing a standing tree and for severing sections from a fallen tree, means on said unit and substantially horizontally reciprocable for feeding a fallen tree to position successive substantially predetermined sections of said fallen tree to said severing means, said feeding means including a pair of opposed tree engageable jaws pivotally supported above a fallen tree and having tooth elements disposed for being aggressively urged into engagement with a tree in response to resistance of the tree to feeding movement, and means on said unit for loading a tree section substantially as it is severed onto a portion of said unit adapted for receiving and retaining a plurality of tree sections.

5. An apparatus for harvesting trees comprising a mobile unit, means mounted on said unit and selectively positionable for severing a standing tree and for severing sections from a fallen tree, said unit including means for receiving and retaining a plurality of tree sections, substantially horizontally reciprocable means for feeding a fallen tree to position successive sections of said fallen tree to be severed by said severing means, means mounting said feeding means on said unit, said mounting means including means for raising and lowering said feeding means to facilitate feeding of a fallen tree to the severing means, and means on said unit for loading a tree section substantially as it is severed onto said receiving and retaining means of the unit.

6. An apparatus for harvesting trees comprising a unit movable in the direction of its longitudinal axis, said unit including means for receiving and retaining a plurality of tree sections, means mounted on said unit and projecting laterally of said axis and selectively positionable for severing a standing tree and for severing sections from a fallen tree, substantially horizontally reciprocable means disposed laterally of and movable generally parallel to said longitudinal axis for feeding a fallen tree to position successive sections of said fallen tree to said severing means, means mounting said feeding means on said unit and including means for retracting the feeding means so as to facilitate maneuvering of the unit, and means on said unit for loading a tree section substantially as it is severed onto said receiving and retaining means of the unit.

7. An apparatus for harvesting trees comprising a mobile unit, means mounted on said unit and selectively positionable for severing a standing tree and for severing sections from a fallen tree, said unit including means for receiving and retaining a plurality of log sections, means on said unit for positively controlling a fallen tree and for bodily feeding a fallen tree to position successive substantially predetermined sections of the fallen tree to be severed from the remainder of the tree by said severing means, means on said unit for loading a tree section substantially as it is severed from the remainder of the tree onto said receiving and retaining means of the unit and for positively positioning the tree sections so that they are loaded in substantially parallel relationship, and means for dumping said receiving and retaining means so as to discharge tree sections on end onto the ground.

8. An apparatus for harvesting trees comprising a unit movable in the direction of its longitudinal axis, means mounted on said unit and projecting laterally of said axis and selectively positionable for severing a standing tree and for severing sections from a fallen tree, said unit including means for receiving and retaining a plurality of log sections and offset along said longitudinal axis from said severing means, means on said unit for controlling a fallen tree and for bodily feeding the fallen tree to position successive substantially predetermined sections of the fallen tree to be severed from the remainder of the tree by said severing means, and means on said unit for loading a tree section substantially as it is severed onto said receiving and retaining means of the unit, said loading means including gripping head means engageable with a severed tree section adjacent said severing means, and means for positively controlling the position of said gripping head means and for moving said gripping head means along and transversely of said longitudinal axis for loading successive tree sections in a predetermined manner and in substantially parallel relationship onto said receiving and retaining means.

9. An apparatus, as defined in claim 8, wherein said last mentioned means is constructed for maintaining said gripping head means in a position for arranging a tree section held thereby substantially parallel to said longitudinal axis, said last mentioned means including linkage means for moving said gripping head means along a path of travel having one portion extending in a plane disposed digonally with respect to said longitudinal axis and another portion extending in a plane disposed substantially perpendicularly to said longitudinal axis for moving the gripping head means and a tree section carried thereby both longitudinally and transversely of said apparatus during a loading operation.

10. An apparatus, as defined in claim 8, wherein said last mentioned means comprises linkage means and a single fluid cylinder and piston means for moving said gripping head means through an arc in excess of 180° for enabling the gripping head means to pick up a tree section substantially on the ground and move the tree section over and across said receiving and retaining means.

11. An apparatus, as defined in claim 10, wherein said piston means includes an elongated rod connected with said linkage means, said linkage means being arranged so that said rod is under compression when substantially retracted and said rod is under tension when substantially extended from said cylinder means so as to reduce any possibility of injury to the rod.

12. An apparatus for harvesting trees comprising a mobile unit, means mounted on said unit and selectively positionable for severing a standing tree and for severing sections from a fallen tree, substantially horizontally reciprocable means for feeding a fallen tree to position successive sections of said fallen tree to be severed by said severing means, means mounted on said unit adjacent said feeding means for encircling a fallen tree engaged by said feeding means and for severing branches from the fallen tree as it is advanced by said feeding means, said unit including means for receiving and retaining a plurality of tree sections, and means on said unit for gripping tree sections while they are being severed and for positively positioning and loading tree sections substantially as they are severed onto said receiving and retaining means with axes of the tree sections substantially parallel to each other.

13. An apparatus for harvesting trees comprising a mobile unit including a cart for receiving and retaining a plurality of tree sections, said cart having a pivoted body portion selectively movable to and from tree section retaining and dumping positions, means mounted on said unit and selectively positionable for severing a standing tree and for severing sections from a fallen tree, means on said unit for positively controlling a fallen tree and for relatively shifting the unit and a fallen tree to position successive predetermined tree sections to be severed by the severing means, means on said unit for loading a tree section substantially as it is severed onto said cart, latch means for locking said cart body means in the retaining position, said latch means including fixed guide means, a slide having a pair of spaced latch elements engageable with a complementary element on said body means, a fixed bridge structure traversing said slide, resilient means disposed between said bridge structure and an element of said slide for urging the slide so as to position said latch elements for engagement with the complementary element, and a single acting hydraulic cylinder disposed oppositely from said spring means and between said bridge structure and another element of said slide for actuating the slide structure so as to disengage the latch element from said complementary element.

14. An apparatus for harvesting trees comprising a mobile unit, means mounted on said unit and selectively positionable for severing a standing tree and for severing sections from a fallen tree, means on said unit for positively controlling a fallen tree and for relatively shifting the unit and a fallen tree to position successive predetermined sections of the fallen tree to be severed by said severing means, said unit including means for receiving and retaining a plurality of tree sections, said last mentioned means comprising generally U-shaped frame means provided by upwardly opening channel elements adapted to receive a plurality of flexible elements for use in tying a plurality of tree sections together, and means on said unit for loading a tree section substantially as it is severed onto said receiving and retaining means.

15. An apparatus for harvesting a tree comprising a mobile unit, shearing means selectively for severing a standing tree and for severing sections from a fallen tree, linkage means adjustably supporting said shearing means on said unit, and fluid pressure actuated means for actuating said linkage means positively to position said shearing means prior to a severing operation, said fluid pressure means including a fluid cylinder and a piston reciprocably disposed within the cylinder, and means for controlling said fluid cylinder for relieving substantially all fluid pressure at opposite ends thereof during a shearing operation and for enabling said shearing means substantially freely to assume various positions relative to the mobile unit in response to resistance from a tree during a severing operation for facilitating the severing operation.

16. An apparatus, as defined in claim 15, wherein said linkage means includes a plurality of pivotally connected members disposed substantially to provide a parallelogram.

17. An apparatus, as defined in claim 16, which includes means for selectively lengthening and shortening one member of said parallelogram linkage mechanism for angularly adjusting the shearing means with respect to the horizontal.

18. An apparatus, as defined in claim 17, wherein said last mentioned means comprises fluid cylinder and piston means, and said actuating means including means for controlling said fluid cylinder and piston means.

19. An apparatus for harvesting trees comprising a base unit, shearing means including a head member having a lateral opening for receiving a tree and a shearing blade slidable on said head member for traversing said opening and severing a tree, means mounting said shearing means on said base unit for selective adjustment to position said head member with said opening facing sideways for receiving a standing tree and facing upwardly for receiving a fallen tree, and means on said base unit for lifting a fallen tree, and then feeding a section of said tree through said opening when the head member is positioned with said opening facing upwardly, said head member providing a bearing for facilitating feeding of the tree and also serving to maintain positive control over the tree so that the feeding means may be repositioned for feeding another section of the tree.

20. An apparatus for harvesting trees comprising a base unit, shearing means including a head member having a lateral opening for receiving a tree and a shearing blade slidable on said head member for traversing said opening and severing a tree, means mounting said shearing means on said base unit for selective adjustment to position said head member with said opening facing sideways for receiving a standing tree and facing upwardly for receiving a fallen tree, substantially horizontally reciprocable feeding means mounted on said base unit for intermittently feeding a fallen tree to position successive sections of said fallen tree through said opening when the head member is positioned with said opening facing upwardly, and means for selectively raising and lowering said feeding means to enable the feeding means to lift a fallen tree in order to position a portion thereof through said opening in the head member, said head member providing a bearing for facilitating feeding of the tree and also serving to provide positive control over the tree during reverse movement of the feeding means.

21. An apparatus, as defined in claim 20, which includes means mounted on said base unit for gripping a tree section during a severing operation and for subsequently loading a severed tree section onto adjacently disposed tree section receiving and retaining means.

22. An apparatus for harvesting trees comprising a mobile unit, means mounted on said unit for severing sections from a fallen tree, and means mounted on said unit for feeding a fallen tree to position successive sections of said fallen tree to be severed by said severing means, said feeding means including substantially horizontally disposed track means, carriage means movable along said track means, opposing jaw members pivotally and slidably connected with said carriage means for movement with said carriage means and also relative to said carriage means about and along an axis substantially parallel to said track means, and cam means on said carriage means engageable with said jaw members for urging the jaw members into engagement with a tree during feeding movement of the carriage means.

23. An apparatus, as defined in claim 22, which includes additional cam means on said carriage means and disposed oppositely from said first mentioned cam means for engaging and spreading said jaw members during reverse movement of the carriage means.

24. An apparatus, as defined in claim 22, which includes means disposed for locking said jaw members against feeding movement relative to the track means during initial feeding movement of the carriage means so as to insure aggressive camming of the jaw members against a tree, said locking means automatically releasing said jaw members after a predetermined force is built up tending to advance the jaw members relative to the track means.

25. An apparatus, as defined in claim 22, which includes means mounted adjacent said track means for encircling a tree and removing branches from the tree as the tree is advanced upon feeding movement of the carriage means.

26. An apparatus, as defined in claim 22, which includes fluid cylinder and piston means for actuating said carriage means, and means interconnecting said carriage means and said piston means for shifting said carriage means at least twice the amount of movement of the piston means.

27. An apparatus, as defined in claim 26, which includes means for raising and lowering said track means to enable lifting of a tree to facilitate feeding thereof.

28. An apparatus for harvesting trees comprising a mobile unit, means mounted on said unit for severing a tree, and means mounted on said unit for feeding a fallen tree to position successive sections of said fallen tree to be severed by said severing means, said feeding means including a substantially horizontally disposed track member, a tree gripping head shiftable along said track member, first and second arm structures pivotally supported on said mobile unit and connected to and supporting opposite ends of said track member, means for pivoting one of said arm structures for raising and lowering the track member, a torque tube extending between and interconnected with said arm structures so that said arm structures move in unison, each of said arm structures including a first portion pivotally connected with said mobile unit for movement between an upright position and a generally horizontal position, said first portion including stop means for limiting downward movement thereof, and a second portion pivotally connected with said first portion for movement downwardly from the horizontal when said first portion is in a substantially horizontal position, stop means between said first and second portions for limiting upward pivotal movement of said second portion with respect to said first portion, and said means for pivoting one arm structure being connected between said mobile unit and said second portion of said one arm structure.

29. An apparatus for harvesting trees comprising a mobile unit, means mounted on and projecting laterally of said unit for severing sections from a fallen tree, said unit including means offset longitudinally of the unit from said severing means for receiving and retaining a plurality of tree sections, and means on said unit for loading tree sections substantially as they are severed onto said receiving and retaining means, said loading means including a boom arm, a tree gripping head pivotally connected to an outer end of said boom arm, linkage means supporting said boom arm for successive movement about first and second axes angularly disposed with respect to each other so that said gripping head will move along a path of travel having a first portion over said receiving and retaining means and in a plane substantially perpendicular to an axis of said receiving and retaining means, and a second portion in a plane extending diagonally with respect to said axis generally toward said severing means so that the gripping head may be positioned to engage a tree adjacent the severing means and then moved to deposit successive tree sections across the receiving and retaining means with the axes of the tree sections substantially parallel to said axis of the receiving and retaining means.

30. An apparatus, as defined in claim 29, which includes a single fluid piston and cylinder means connected with and for actuating said linkage means so as to move the boom arm through an arc in excess of 180° between a fully lowered position adjacent said severing means and a fully elevated position adjacent said receiving and retaining means, said piston means including an elongated rod connected with said linkage means, and said piston and cylinder means and linkage means being disposed with said rod being extended and under tension when the boom arm is in said lowered position and retracted and under compression when said boom arm is in said elevated position.

31. An apparatus for harvesting trees comprising a mobile unit, means mounted on said unit for severing sections from a fallen tree, said unit including means for receiving and retaining a plurality of tree sections, and means on said unit for loading tree sections substantially as they are severed onto said receiving and retaining means, said loading means including linkage means supporting said boom arm for movement to and from tree section pickup and discharge positions respectively adjacent said severing means and over said receiving and retaining means, and a single fluid pressure cylinder and piston means connected with and disposed for actuating said linkage means for moving said boom arm between lowered and elevated positions, said piston means including an elongated rod, said rod being extended and under tension when the boom arm is in said lowered position and retracted and under compression when said boom arm is in said elevated position.

32. An apparatus for harvesting trees comprising a mobile unit, means mounted on said unit for severing sections from a fallen tree, and means mounted on said unit and including generally horizontally reciprocable head means for feeding successive sections of a fallen tree to said severing means, said head means comprising a pair of opposing jaw members, and a plurality of tooth elements on each of said jaw members for engaging a tree, each of said tooth elements having a pointed free end and a substantially V-shaped transverse cross section so as to accomplish secure and positive engagement with a tree for facilitating the feeding of sections of predetermined length to the severing means.

33. The method of harvesting trees comprising severing a standing tree, positively holding a section of the fallen tree, severing said section from the fallen tree while continuously positively holding said section, loading said section substantially as it is severed onto a stack while continuously positively holding and positioning said section, relatively moving said stack and the fallen tree to position the stack adjacent a second section of the tree, holding said second section with the loading means and severing said second section from the fallen tree while continuously positively holding said second section, loading the second section substantially as it is severed onto the stack while continuously positively holding and positioning said second section, and repeating the steps of positively holding tree sections, relatively moving the stack and the tree, severing the tree sections and loading the tree sections onto the stack until substantially the entire fallen tree has been sectionalized.

34. An apparatus for harvesting trees comprising a mobile unit, a shearing head structure having a lateral opening for receiving a tree and a shearing blade shiftable for traversing said opening and severing a tree, means mounting said shearing head structure on said mobile unit for selective adjustment to position the shearing head structure with said opening facing sideways for receiving a standing tree and facing upwardly for receiving a fallen tree, and means on said mobile unit for lifting a fallen tree and then feeding a section of said tree through said opening when the head structure is positioned with said opening facing upwardly, said head structure serving to maintain positive control over the tree so that the feeding means may be repositioned for feeding another section of the tree.

35. An apparatus for harvesting trees comprising a mobile unit, means mounted on said unit for severing sections from a fallen tree, and means mounted on said unit for feeding a fallen tree along a predetermined path of travel extending generally longitudinally of said unit for positioning successive sections of said fallen tree to be severed by said severing means, said feeding means including elongated track means extending along said path of travel, carriage means movable along said track means, opposing tree engageable members on said carriage means at least one of which is pivotable relative to said carriage means for securing a tree between said members, and actuating means for urging said pivotable member against a tree and for then advancing said members with the carriage means.

36. An apparatus for harvesting trees comprising a mobile unit, means mounted on said unit for severing sections from a fallen tree, means mounted on said unit for feeding a fallen tree along a predetermined path of travel extending generally longitudinally of said unit for positioning successive sections of said fallen tree to be severed by the severing means, said feeding means including elongated track means extending along said path of travel, carriage means reciprocably movable along said track means, opposing tree engageable members on said carriage means at least one of which is pivotal relative to said carriage means for securing a tree between said members, means for urging said pivoted member against a tree during feeding movement of the carriage means, and means mounted adjacent said track means and including generally annular cutting edge means for encircling a tree and removing branches therefrom as the tree is advanced during feeding movement of the carriage means.

References Cited in the file of this patent
UNITED STATES PATENTS

| Number | Name | Date |
|---|---|---|
| 825,518 | Cox | July 10, 1906 |
| 1,262,943 | Gustafson | Apr. 16, 1918 |
| 1,417,425 | Thompson | May 23, 1922 |
| 1,499,008 | Fetzer | June 24, 1924 |
| 1,592,656 | Corona | July 13, 1926 |
| 1,867,446 | Doubek | July 12, 1932 |
| 1,888,664 | Geddes et al. | Nov. 22, 1932 |
| 2,310,152 | Ronning | Feb. 2, 1943 |
| 2,433,598 | Chadwick | Dec. 30, 1947 |
| 2,542,952 | White | Feb. 20, 1951 |
| 2,550,185 | Busch | Apr. 24, 1951 |
| 2,586,622 | Dennis | Feb. 19, 1952 |
| 2,594,695 | Storey | Apr. 29, 1952 |
| 2,603,365 | Moores | July 15, 1952 |
| 2,614,644 | Gustafson | Oct. 21, 1952 |
| 2,635,659 | Gerdine | Apr. 21, 1953 |
| 2,643,012 | Wahl | June 23, 1953 |
| 2,707,008 | Bannister | Apr. 26, 1955 |
| 2,751,943 | Ford | June 26, 1956 |
| 2,777,483 | Cherem | Jan. 15, 1957 |
| 2,820,493 | Davis | Jan. 21, 1958 |
| 2,843,165 | Sherron | July 15, 1958 |
| 2,845,101 | Hoadley | July 29, 1958 |
| 2,876,816 | Busch et al. | Mar. 10, 1959 |
| 2,882,941 | Pope | Apr. 21, 1959 |